United States Patent
Egawa et al.

(10) Patent No.: US 7,809,488 B2
(45) Date of Patent: Oct. 5, 2010

(54) HEADWAY MAINTENANCE SYSTEM AND METHOD

(75) Inventors: Kenichi Egawa, Tama (JP); Satoshi Tange, Fujisawa (JP); Takeshi Sugano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 783 days.

(21) Appl. No.: 11/740,543

(22) Filed: Apr. 26, 2007

(65) Prior Publication Data

US 2007/0255481 A1 Nov. 1, 2007

(30) Foreign Application Priority Data

Apr. 28, 2006 (JP) .............................. 2006-125293

(51) Int. Cl.
*B60T 7/12* (2006.01)
(52) U.S. Cl. ........................................ 701/96; 701/300
(58) Field of Classification Search ................... 701/96, 701/300–302; 340/425.5, 435–436
See application file for complete search history.

(56) References Cited

U.S. PATENT DOCUMENTS

| | | | |
|---|---|---|---|
| 6,125,321 A * | 9/2000 | Tabata et al. | ................... 701/97 |
| 6,178,372 B1 * | 1/2001 | Tabata et al. | ................... 701/97 |
| 6,389,347 B1 | 5/2002 | Nozaki | |
| 7,155,342 B2 * | 12/2006 | Kobayashi et al. | .......... 701/301 |
| 2001/0056009 A1 | 12/2001 | Ochiai et al. | |
| 2003/0233187 A1 | 12/2003 | Egami | |
| 2003/0236608 A1 | 12/2003 | Egami | |
| 2005/0209743 A1 | 9/2005 | Egami | |

FOREIGN PATENT DOCUMENTS

| | | |
|---|---|---|
| EP | 1158219 A2 | 11/2001 |
| EP | 1375234 A2 | 1/2004 |
| JP | H02-269401 | 11/1990 |
| JP | 2005-008147 | 1/2005 |

* cited by examiner

*Primary Examiner*—Yonel Beaulieu
(74) *Attorney, Agent, or Firm*—Global IP Counselors, LLP

(57) ABSTRACT

A headway maintenance assist system is provided with a correction section in which a drive force/accelerator actuation relationship between an accelerator actuation amount and a target drive force is changed to a drive force/accelerator relationship that is different than an ordinary drive force/accelerator relationship so that the driver more readily notices the accelerator reaction force when the accelerator reaction force is applied to the accelerator to alert the driver under prescribed conditions.

12 Claims, 18 Drawing Sheets

HEADWAY MAINTENANCE SYSTEM AND METHOD

CROSS-REFERENCE TO RELATED APPLICATIONS

This application claims priority to Japanese Patent Application No. 2006-125293, filed on Apr. 28, 2006. The entire disclosure of Japanese Patent Application No. 2006-125293 is hereby incorporated herein by reference.

BACKGROUND OF THE INVENTION

1. Field of the Invention

The present invention generally relates to an assistance technique for maintaining a headway distance between a host vehicle and a preceding vehicle. More specifically, the present invention relates to maintaining a headway distance from a preceding vehicle based on a running condition of the host vehicle and providing a haptic signal in the accelerator.

2. Background Information

Vehicle assist systems have been proposed to alert a driver in accordance with a reduction in a headway distance, and assist in the maintenance of headway distance. In Japanese Laid-Open Patent Application No. 2005-8147, it has been proposed to alert the driver of the reduction in the headway distance by increasing the reaction force of the accelerator in accordance with a reduction in headway distance.

In view of the conventional headway maintenance assist systems, it will be apparent to those skilled in the art from this disclosure that there exists a need for an improved vehicle headway maintenance assist system. This invention addresses this need in the art as well as other needs, which will become apparent to those skilled in the art from this disclosure.

SUMMARY OF THE INVENTION

However, it has been discovered that when the accelerator position is at a low setting such as when the vehicle speed is low, i.e., when the accelerator is being lightly pressed, the driver does not easily recognize when a reaction force is being applied to the accelerator. Thus, the driver may not be alerted of the reduction in the headway distance to a preceding vehicle.

In accordance with one aspect of the present invention, a vehicle headway maintenance assist system is provided that basically comprises a preceding vehicle detection section, an accelerator actuation amount detection section, a reaction force computing section, a running condition detection section, a driving force determination section, a drive source control section, an accelerator return detection section and a correction section. The preceding vehicle detection section is configured to detect a headway distance between a host vehicle and a preceding vehicle. The accelerator actuation amount detection section is configured to detect an accelerator actuation amount of an accelerator of the host vehicle. The reaction force computing section is configured to calculate a reaction force to be generated in the accelerator based on the headway distance detected by the preceding vehicle detection section. The reaction force computing section reaction force generating section is configured to generate the reaction force calculated by the reaction force computing section in the accelerator. The running condition detection section is configured to detect a running condition of the host vehicle. The driving force determination section is configured to determine a target driving force of the host vehicle in accordance with the accelerator actuation amount detected by the accelerator actuation amount detection section. The drive source control section is configured to control an output of a drive source towards the target driving force determined by the driving force determination section. The accelerator return detection section is configured to detect a return operation of the accelerator of the host vehicle to decrease acceleration. The correction section is configured to change from using a first drive force/accelerator actuation relationship between the target drive force and the accelerator actuation amount to a second drive force/accelerator actuation relationship based on the running condition detected by the running condition detection section. The correction section is further configured to restore the first drive force/accelerator actuation relationship when the accelerator return detection section detects the return operation of the accelerator during travel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
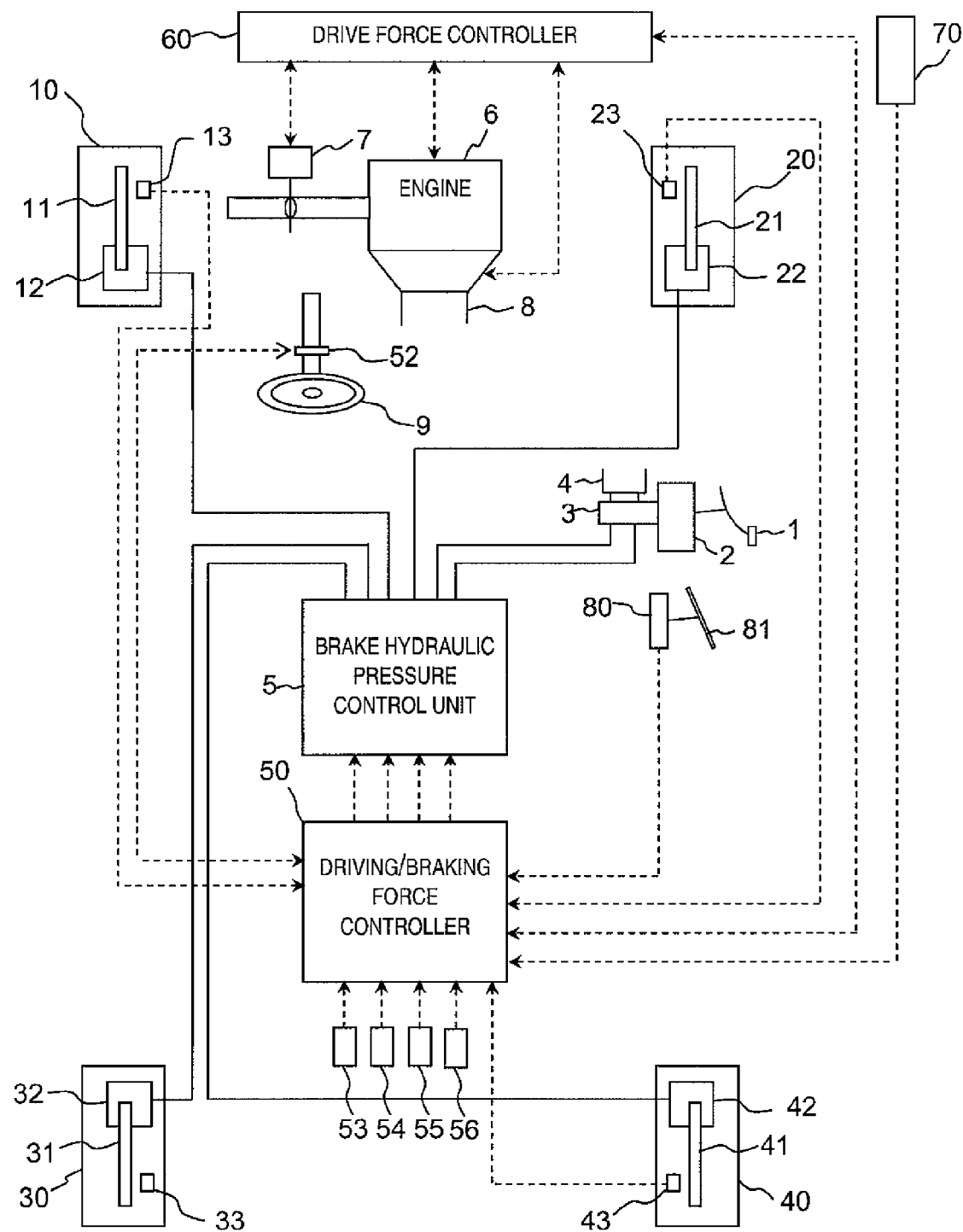
FIG. 1 is a vehicle is schematically illustrated with a vehicle headway maintenance assist system in accordance with a first embodiment of the present invention.

Referring initially to FIG. 1, a vehicle (hereinafter also called "the host vehicle") is schematically illustrated with a vehicle headway maintenance assist system in accordance with a first embodiment of the present invention. In this illustrated embodiment, the headway maintenance assist system is installed in the host vehicle that is a rear-wheel drive vehicle having an automatic transmission and a conventional differential gear. The host vehicle includes a hydraulic braking apparatus that uses a brake pedal 1, a booster 2, a master cylinder 3, a reservoir 4 and a pressure control unit 5 for the driver to input a target braking force to a left front wheel 10 via a brake disk 11 and a wheel cylinders 12, a right front wheel 20 via a brake disk 21 and a wheel cylinders 22, a left rear wheel 30 via a brake disk 31 and a wheel cylinders 32, and a right rear wheel 40 via a brake disk 41 and a wheel cylinders 42. In this host vehicle, the front wheels 10 and 20 and the rear wheels 30 and 40 are configured so that the braking force of the left and right wheels can be independently controlled. Thus, the brake disks 11, 21, 31 and 41 and the wheel cylinders 12, 22, 32 and 42 are configured and arranged in a conventional manner such that the wheel cylinders 12, 22, 32 and 42 frictional hold a corresponding one of the brake disk disks 11, 21, 31 and 41 for imparting a brake force (braking force) to each wheel by supplying hydraulic braking pressure to each of the wheel cylinders 12, 22, 32 and 42 of the wheels 10, 20, 30 and 40.

The pressure control unit 5 is disposed between the master cylinder 3 and the wheel cylinders 12, 22, 32 and 42. Hydraulic pressure that has been increased by the master cylinder 3 is supplied to each of the wheel cylinders 12, 22, 32 and 42 in accordance with the amount by which the driver depresses the brake pedal 1. The pressure control unit 5 individually controls the brake fluid pressure of the wheel cylinders 12, 22, 32 and 42. The pressure control unit 5 has actuators for forming separate front, rear, left, and right hydraulic pressure supply systems (channels). Thus, the wheels 10, 20, 30 and 40 are thereby separately braked. The actuators are configured using proportion solenoid valves so that, e.g., the hydraulic pressure of the wheel cylinders 12, 22, 32 and 42 can be set to an arbitrary brake fluid pressure.

The host vehicle includes an engine 6, a throttle control device 7, an automatic transmission 8 and a steering wheel 9 as well as other conventional power train components. The host vehicle also includes a driving/braking force controller 50 and a drive force controller 60. The drive force controller 60 is configured to control a drive force (driving force) of the rear (drive) wheels 30 and 40 based on a drive force instruction value inputted from the driving/braking force controller 50. The driving/braking force controller 50 is configured to perform engine control by controlling an amount of fuel injected into the engine 6, for controlling the throttle position with the throttle control device 7, for controlling the automatic transmission 8, as well as other conventional components relating the engine 6. Thus, the drive force of the rear (drive) wheels 30 and 40 is based on this control of the engine 6.

The host vehicle further includes a plurality of wheel speed sensors 13, 23, 33 and 43, a steering angle sensor 52, an acceleration sensor 53, a yaw rate sensor 54, a master cylinder fluid pressure sensor 55 and an accelerator pedal position sensor 56. The signals from the sensors 13, 23, 33, 43, and 52 to 56 are inputted to the driving/braking force controller 50. In particular, the wheel speed sensors 13, 23, 33 and 43 constitute a wheel speed detection section that is configured and arranged to detect the rotational wheel speeds Vw1, Vw2, Vw3, Vw4 of the wheels and send a signal indicative of the wheel speeds to the driving/braking force controller 50. The steering angle sensor 52 constitutes a steering angle detection section that is configured and arranged to detect a steering angle δ of the steering wheel 9 and send a signal indicative of the steering angle to the driving/braking force controller 50. The acceleration sensor 53 constitutes an acceleration detection section that is configured and arranged to detect the longitudinal acceleration Xg of the vehicle and the transverse acceleration Yg of the vehicle and send a signal indicative of the longitudinal and transverse accelerations of the vehicle to the driving/braking force controller 50. The yaw rate sensor 54 constitutes a yaw rate detection section that is configured and arranged to detect the yaw rate ø generated in the vehicle and send a signal indicative of the yaw rate to the driving/braking force controller 50. The master cylinder fluid pressure sensor 55 constitutes a master cylinder fluid pressure detection section that is configured and arranged to detect the master cylinder fluid pressure Pm and send a signal indicative of the master cylinder fluid pressure to the driving/braking force controller 50. The accelerator pedal position sensor 56 constitutes an accelerator pedal position detection section that is configured and arranged to detect the accelerator pedal position Acc and send a signal indicative of the accelerator pedal position to the driving/braking force controller 50.

The drive force controller 60 is configured to calculate an engine torque τa, a desired drive force or torque τm based on the amount by which the accelerator pedal 1 is depressed by the driver, and a drive force or torque τw in the drive wheel shaft. The engine torque τa, the desired drive force cm and the drive force τw are inputted from the drive force controller 60 to the driving/braking force controller 50.

The host vehicle further includes a laser radar 70, which for example is mounted in a front portion of the host vehicle such as in the front grill, the front bumper or in some other appropriate location of the vehicle. The laser radar 70 detects the headway distance L from the preceding vehicle and the relative speed Vr by sending laser light out in front of the host vehicle and receiving the light that is reflected back off the preceding vehicle located in front of the host vehicle. The relative speed Vr is a value obtained by subtracting the speed of the preceding vehicle from the speed of the host vehicle. The headway distance L and the relative speed Vr detected by the laser radar 70 are sent to the driving/braking force controller 50. Thus, the laser radar 70 constitutes a preceding vehicle detection section that is configured and arranged to detect the headway distance L and the relative speed Vr, and send a signal indicative of the headway distance and the relative speed to the driving/braking force controller 50.

The host vehicle further includes an accelerator pedal actuator 80 and an accelerator pedal 81. The accelerator pedal actuator 80 is configured and arranged to impart a reaction force to the accelerator pedal 81 based on a command from the driving/braking force controller 50. As used herein, the term "reaction force" refers to force that is applied in a direction opposite to the direction in which the driver depresses the accelerator pedal 81. Thus, the accelerator pedal actuator 80 constitutes a haptic information conveying section that is configured and arranged to convey a risk potential to a driver as haptic information through the accelerator pedal 81, which constitutes a driver-operated driving operation device.

In the headway maintenance assist system in the illustrated embodiment of the present invention, when the headway distance L between the host vehicle and the preceding vehicle is less than a first headway distance threshold $L^*1$, a headway maintenance assistance control is performed in accordance with the operation of the accelerator pedal 81. In particular, when the driver is not operating (depressing) the acceleration pedal 81, the headway maintenance assistance control includes a primary deceleration control that is performed to decelerate the vehicle when the headway distance L is less than the first headway distance threshold $L^*1$ and a secondary deceleration control that is performed to decelerate the vehicle when the headway distance L is less than a second headway distance threshold $L^*2$, which is less than the first headway distance threshold $L^*1$. However, if the driver is operating the accelerator pedal 81 when the headway distance L is less than the second headway distance threshold $L^*2$ ($L^*2 < L^*1$), then a reaction force is applied to the accelerator pedal 81.

According to the present invention, it is possible to positively notify the driver that the reaction force has been applied to the accelerator pedal 81 because the relationship between the drive force of the host vehicle and the accelerator pedal position is corrected based on the detected running condition of the host vehicle so that the driver can more readily notice an accelerator actuation reaction force. In other words, in the present invention, the running condition of the host vehicle and the accelerator pedal actuation amount are detected, and a relationship between the target drive force of the host vehicle and a predetermined accelerator pedal actuation amount is corrected based on the running condition of the host vehicle. However, an acceleration control corresponding to the preceding vehicle is not necessarily performed when the preceding vehicle accelerates. Thus, the headway maintenance assist system as described herein is not equipped with an acceleration control program to maintain a prescribed following distance from the preceding vehicle (e.g., an adaptive cruise control). Of course, an adaptive cruise control could be included if needed and/or desired.

The detailed processes of the headway maintenance assist system will now be described with reference to FIGS. 2 through 10.

Figure 2:
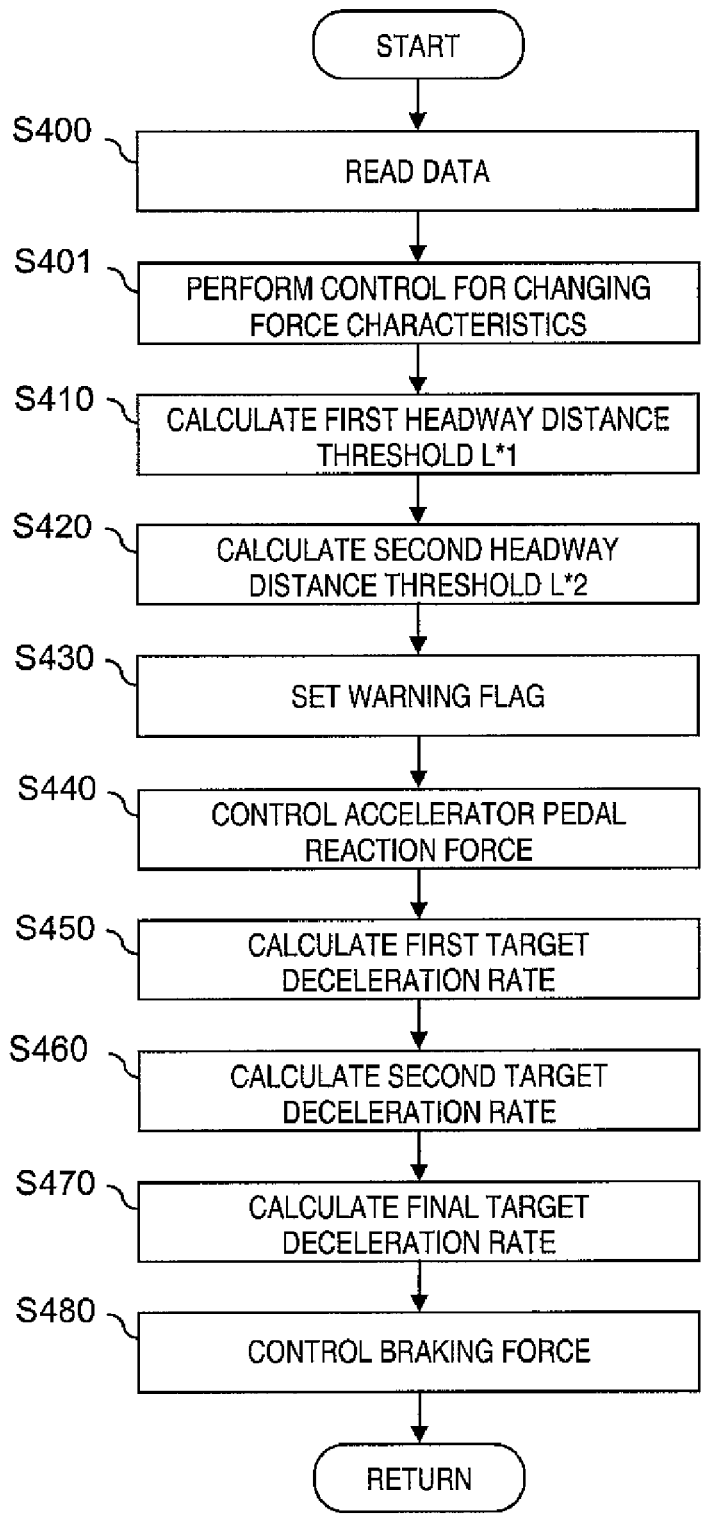
FIG. 2 is a flowchart showing the processing executed by the headway maintenance assist system in accordance with the first embodiment of the present invention.

FIG. 2 is a flowchart showing the process performed by the headway maintenance assist system in the illustrated embodiment. When the host vehicle is started up, the driving/braking force controller 50 initiates the process step S400. In step S400, the following data is read, e.g., the accelerator pedal position Acc detected by the accelerator pedal position sensor 56, the wheel speeds Vw1, Vw2, Vw3, Vw4 detected by the wheel speed sensors 13, 23, 33 and 43, and the headway distance L and the relative speed Vr with respect to the preceding vehicle as detected by the laser radar 70. The process then advances to step S401.

In step S401, the driving/braking force controller 50 executes a torque or force characteristic correction control that makes adjustments to the force characteristic by changing the relationship between the accelerator pedal 81 and the drive force in accordance with the current running condition of the host vehicle. The specifics of the routine for controlling changes in the relationship between the accelerator pedal and the drive force are described in detail later with reference to the flowchart shown in FIG. 7. After the relationship between the position of the accelerator pedal and the drive force has been changed in step S401, the process advances to step S410.

In step S410, a first headway distance threshold $L^*1$ is calculated. The first headway distance threshold $L^*1$ is calculated from the sum of a steady-state term $L^*h1$, which does not depend on the running condition of the host vehicle, and a transient term $L^*r1$, which depends on the running condition of the host vehicle. The specific method for calculating the first headway distance threshold $L^*1$ will be described using the flowchart shown in FIG. 3.

Figure 3:
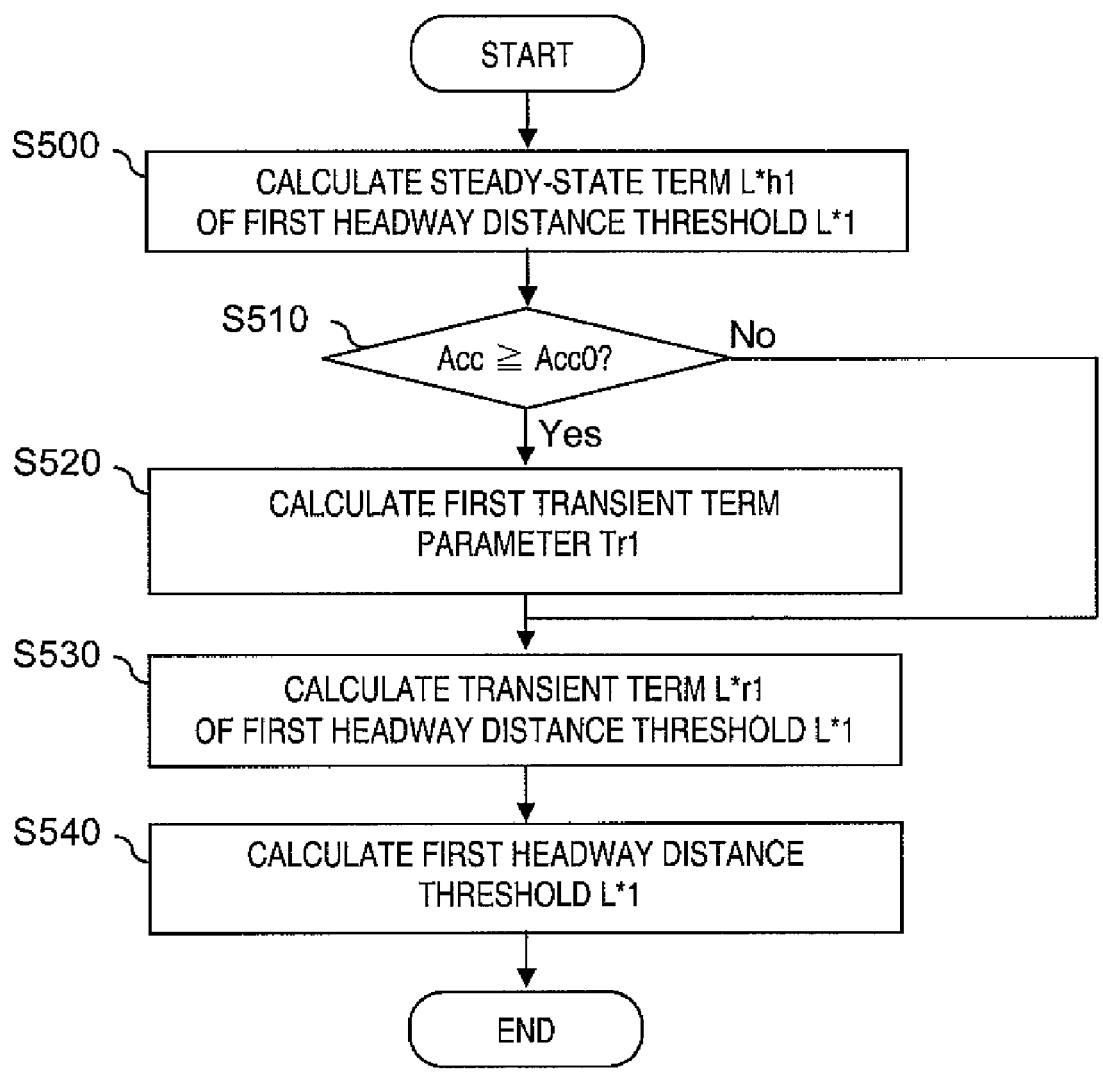
FIG. 3 is a flowchart showing the processing executed for calculating the first headway distance threshold L*1 in the headway maintenance assist system of the first embodiment of the present invention.

In step S500 of the flowchart shown in FIG. 3, the steady-state term $L^*h1$ is calculated according to Equation 1 below.

$$L^*h1 = Va \times Th \qquad \text{(Equation 1)}$$

In this Equation 1, the parameter Va represents the speed of the preceding vehicle as calculated based on the speed V of the host vehicle and the relative speed Vr, while the parameter Th represents a specific headway time of the host vehicle. The speed V of the host vehicle is calculated by determining a mean value of the speeds Vw1 and Vw2 of the front wheels as detected by the vehicle speed sensors 13 and 23.

In step S510, which follows step S500, the driving/braking force controller 50 determines whether the accelerator pedal position Acc detected by the accelerator pedal position sensor 56 is equal to or greater than a specific accelerator pedal position threshold Acc0. If the accelerator pedal position Acc is determined to be equal to or greater than the specific accelerator pedal position threshold Acc0, then it is determined that the driver is depressing on the accelerator pedal 81. Thus, an accelerator operation flag Facc is turned "on" when it is determined that the driver is depressing on the accelerator pedal 81, and then the process advances to step S520. If the accelerator pedal position Acc is determined to be less than the specific accelerator pedal position threshold Acc0, then it is determined that the driver is not depressing on the accelerator pedal 81. Thus, the accelerator operation flag Facc is turned "off" when it is determined that the driver is not depressing on the accelerator pedal 81, and then the process advances to step S530.

In step S520, Equation 2 is used to calculate a first transient term parameter Tr1 for calculating the transient term $L^*r1$ of the first headway distance threshold $L^*1$.

$$Tr1 = (L - L^*h1)/Vr \qquad \text{(Equation 2)}$$

In this Equation 2, the first transient term parameter Tr1 is the time taken for the headway distance L to reach the steady-state term $L^*h1$ of the first headway distance threshold, assuming that the current relative speed Vr is maintained. When the parameter Tr1 is calculated, the process advances to step S530.

As can be seen from the process in steps S510 and S520, the first transient term parameter Tr1 for calculating the transient term $L^*r1$ of the first headway distance threshold is calculated (renewed) only when the accelerator operation flag Facc is turned on. Therefore, the first transient term parameter Tr1 is set according to the actual headway distance L when the accelerator pedal 81 is being depressed, and the parameter value that was in effect when the accelerator pedal 81 ceased to be depressed is maintained when the accelerator pedal 81 is not being depressed.

In step S530, the transient term L*r1 of the first headway distance threshold L*1 is calculated according to Equation 3, and the process advances to step S540.

$$L*r1 = Tr1 \times Vr \quad \text{(Equation 3)}$$

In step S540, the first headway distance threshold L*1 is calculated by adding together the steady-state term L*h1 of the first headway distance threshold calculated in step S500, and the transient term L*r1 of the headway distance threshold calculated in step S520 (see Equation 4).

$$L*1 = L*h1 + L*r1 \quad \text{(Equation 4)}$$

When the accelerator pedal 81 is being depressed (when the accelerator operation flag Facc is turned on), L*1=L according to Equations 2, 3, and 4. After the first headway distance threshold L*1 is calculated, then the process advances to step S420 in the flowchart shown in FIG. 2.

Figure 17:
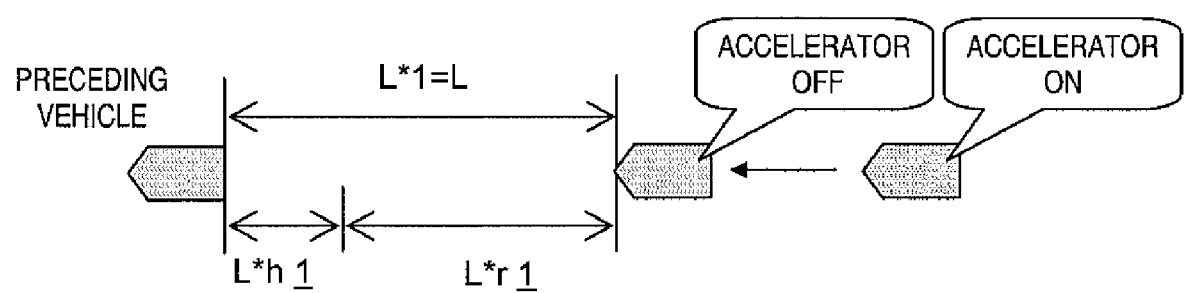
FIG. 17 is a diagram showing the headway distance threshold L* when the driver ceases to operate (depress) the accelerator pedal.

FIG. 17 is a diagram showing the headway distance threshold L*1 when the driver ceases to depress on the accelerator pedal 81 (i.e., when the accelerator operation flag Facc is turned from "on" to "off"). The headway distance threshold L*1 is set to the headway distance L at the time the accelerator pedal 81 ceases to be depressed, as shown in FIG. 17.

In step S420, the second headway distance threshold L*2 is calculated. The second headway distance threshold L*2 is calculated from the sum of a steady-state term L*h2 calculated regardless of whether the preceding vehicle is decelerating or not and a transient term L*r2 calculated (updated) when the preceding vehicle is decelerating. The specific method for calculating the second headway distance threshold L*2 will now be described using the flowchart shown in FIG. 4.

Figure 4:
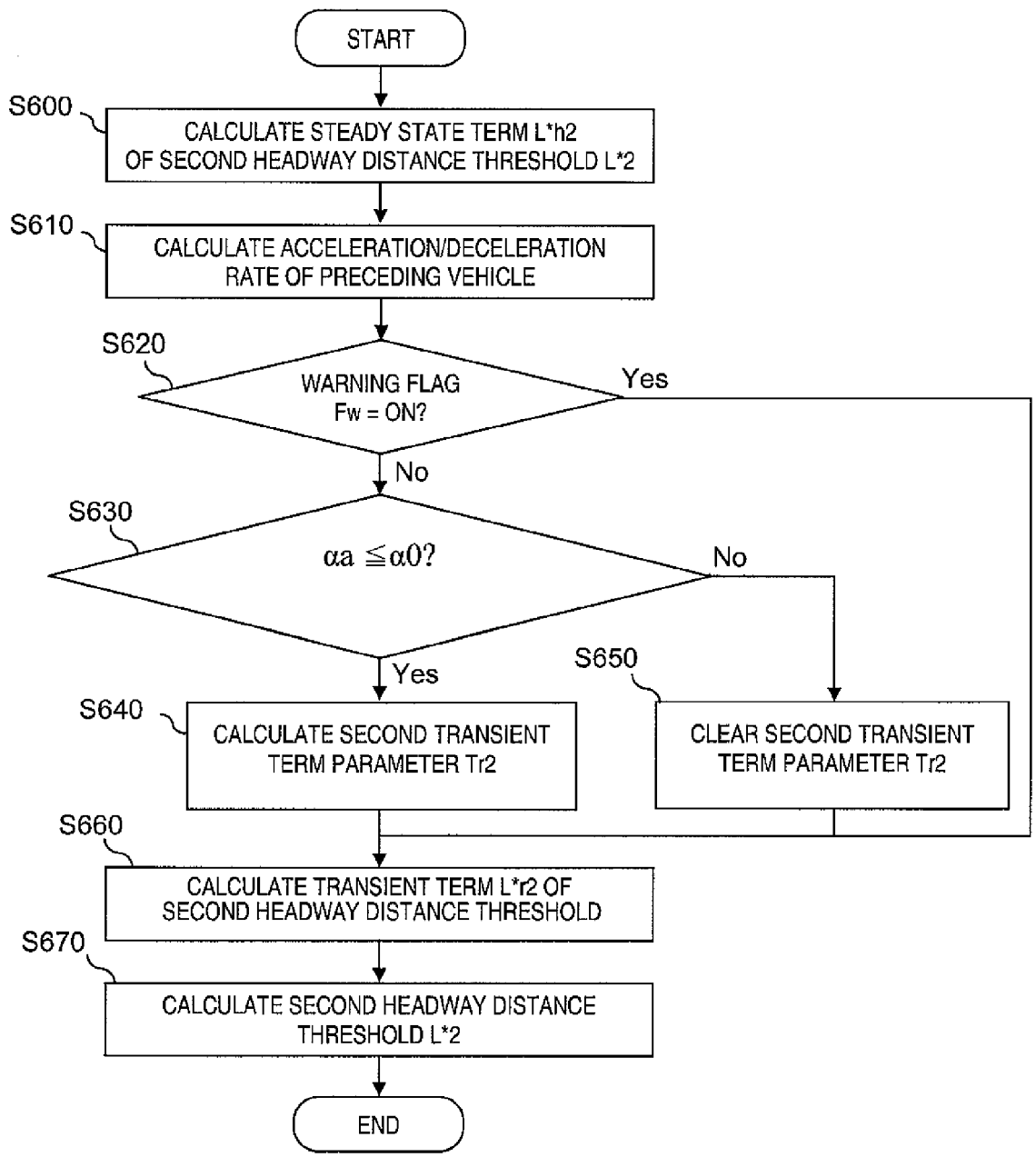
FIG. 4 is a flowchart showing the processing executed for calculating the second headway distance threshold L*2 in the headway maintenance assist system of the first embodiment of the present invention

In step S600 in the flowchart shown in FIG. 4, the steady-state term L*h2 is calculated based on the speed V of the host vehicle and the relative speed Vr. The function for calculating the steady-state term L*h2 is provided in advance based on the host vehicle speed V and the relative speed Vr. Thus, the steady-state term L*h2 is calculated by substituting the host vehicle speed V and the relative speed Vr into this function. When the steady-state term L*h2 of the second headway distance threshold is calculated, the process advances to step S610.

In step S610, the acceleration/deceleration rate αa of the preceding vehicle is calculated, the process advances to step S620. In step S620, a determination is made as to whether a warning flag Fw, which is set in a later-described step S430 (see FIG. 2), has been turned on. The processes in steps S400 through S480 are repeated, and therefore, the determination in step S620 is made in this case based on the state of the warning flag Fw set during the preceding process. When the warning flag Fw is determined to be "on", the process advances to step S660, and when the warning flag Fw is determined to be "off", the process advances to step S630.

In step S630, the driving/braking force controller 50 determines whether the acceleration/deceleration rate αa of the preceding vehicle as calculated in step S610 is equal to or less than a specific acceleration/deceleration rate α0. The specific acceleration/deceleration rate α0 is a threshold for determining whether the preceding vehicle is decelerating or accelerating. Thus, the values of rates αa and α0 are both positive during acceleration and both negative during deceleration. When the acceleration/deceleration rate αa of the preceding vehicle is determined to be equal to or less than the specific acceleration/deceleration rate α0, the driving/braking force controller 50 determines that the preceding vehicle is decelerating, a preceding vehicle deceleration flag Fdec_a is turned "on", and the process then advances to step S640. When the acceleration/deceleration rate αa of the preceding vehicle is determined to be greater than the specific acceleration/deceleration rate α0, the driving/braking force controller 50 determines that the preceding vehicle is not decelerating, the preceding vehicle deceleration flag Fdec_a is turned "off", and the process advances to step S650.

In step S640, a second transient term parameter Tr2 is calculated from Equation 5, below, for calculating the transient term L*r2 of the second headway distance threshold.

$$Tr2 = (L - L*h2)/Vr \quad \text{(Equation 5)}$$

In this Equation 5, the second transient term parameter Tr2 is the time resulting from dividing the remaining distance (L−L*h2) by the relative speed Vr. The remaining distance is the actual headway distance L less the steady-state term L*h2 of the second headway distance threshold at the time when the preceding vehicle begins to decelerate. When the second transient term parameter Tr2 has been calculated, the process advances to step S660.

In step S650, which takes effect after it is determined that the preceding vehicle is not decelerating, the second transient term parameter Tr2 is cleared (i.e., set to 0) for calculating the transient term L*r2 of the second headway distance threshold, and the process advances to step S660.

In step S660, the transient term L*r2 of the second headway distance threshold is calculated from Equation 6, below, and the process advances to step S670.

$$L*r2 = Tr2 \times Vr \quad \text{(Equation 6)}$$

In step S670, the second headway distance threshold L*2 is calculated by adding the steady-state term L*h2 and the transient term L*r2 of the second headway distance threshold (see Equation 7).

$$L*2 L*h2 + L*r2 \quad \text{(Equation 7)}$$

In step S670, when the second headway distance threshold L*2 has been calculated, the process advances to step S430 in the flowchart shown in FIG. 2. In step S430, the warning flag Fw is set. Therefore, a deviation ΔL2 between the second headway distance threshold L*2 calculated in step S420 and the headway distance L from the preceding vehicle detected by the laser radar 70 is first calculated using Equation 8, below.

$$\Delta L2 = L*2 - L \quad \text{(Equation 8)}$$

If the deviation ΔL2 calculated from Equation 8 is equal to or greater than 0, the headway distance L from the preceding vehicle is equal to or less than the second headway distance threshold L*2, and the warning flag Fw is therefore turned "on" in step S430. If the deviation ΔL2 is less than 0, the warning flag Fw is turned "off" in step S430. The process then advances to step S440 after the warning flag Fw has been set.

In step S440, accelerator pedal reaction force control is implemented in which the reaction force is applied to the accelerator pedal 81 in accordance with the deviation ΔL2 in the headway distance. The detailed processes of this control accelerator pedal reaction force for applying reaction force to the accelerator pedal 81 are described using the flowchart shown in FIG. 5.

Figure 5:
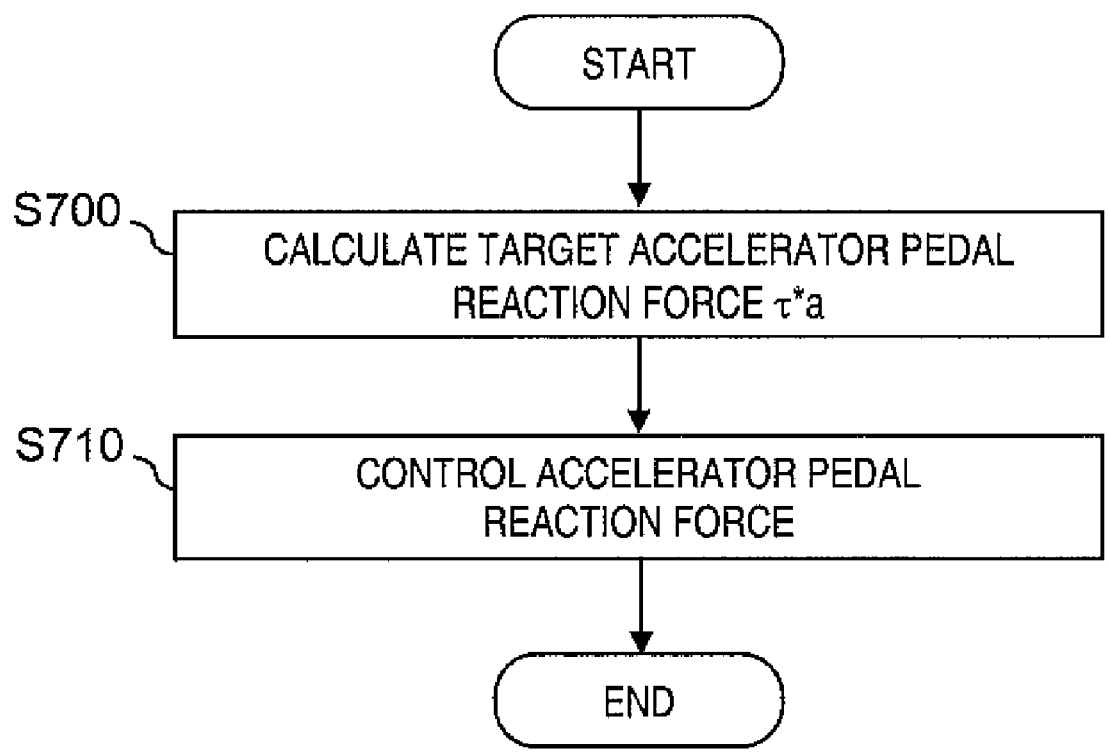
FIG. 5 is a flowchart showing the processing executed for controlling the reaction force that is imparted to the accelerator pedal in the headway maintenance assist system of the first embodiment.

In step S700 of the flowchart shown in FIG. 5, the target accelerator pedal reaction force τ*a is calculated from Equation 9.

$$\tau^*a = Kp \times \Delta L2 \quad \text{(Equation 9)}$$

The value Kp (Kp>0) in Equation 9 is a specific gain for calculating the target accelerator pedal reaction force $\tau^*a$ from the headway distance deviation $\Delta L2$.

In step S710, which follows step S700, the accelerator pedal actuator 80 is instructed to subject the accelerator pedal 81 to a reaction force corresponding to the target accelerator pedal reaction force $\tau^*a$ calculated in step S700. Having received this instruction, the accelerator pedal actuator then applies a reaction force corresponding to the target accelerator pedal reaction force $\tau^*a$ to the accelerator pedal 81. As is clear from Equation 9, the reaction force is applied to the accelerator pedal 81 when the headway distance deviation $\Delta L2$ is positive; i.e., when the headway distance L is less than the headway distance threshold L*2. When the process in step S710 is complete, the process advances to step S450 in the flowchart shown in FIG. 2.

In step S450, a first target deceleration rate $\alpha^*1$ is calculated from Equation 10 based on the first headway distance threshold L*1 calculated in step S410 and based on the headway distance L from the preceding vehicle detected by the laser radar 70.

$$\alpha^*1 = Kv - Kr1 \times (L^*1 - L) \quad \text{(Equation 10)}$$

The value Kr1 is the gain for calculating the first target deceleration force produced in the host vehicle. The gain Kv is the gain for converting the target deceleration force into the target deceleration rate, and is set in advance based on the host vehicle specifications. The first target deceleration rate $\alpha^*1$ is a positive value during acceleration and a negative value during deceleration.

Figure 18:
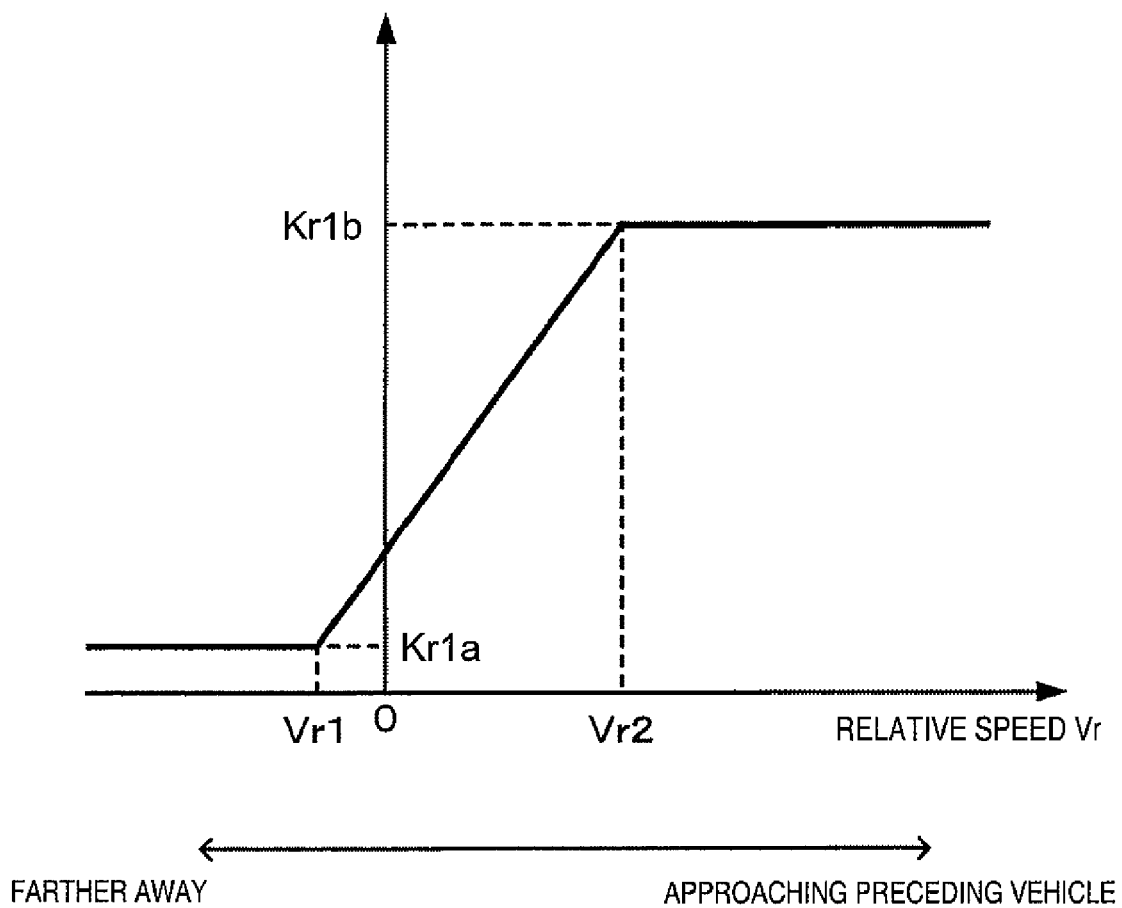
FIG. 18 is a diagram showing the relationship between the relative speed Vr and the gain Kr.

FIG. 18 is a diagram showing the relationship between the relative speed Vr and the gain Kr1. As shown in FIG. 18, the greater the relative speed Vr; i.e., the closer the host vehicle is to the preceding vehicle, the greater the gain Kr1 is; and the smaller the relative speed Vr is, the smaller the gain Kr1 is. When the relative speed Vr is less than a first relative speed Vr1, then the value of the gain Kr1 is set to a first specific gain Kr1a. When the relative speed Vr is greater than a second relative speed Vr2, the value of the gain Kr1 is a second specific gain Kr1b. The table specifying the relationship between relative speed Vr and gain Kr1, as shown in FIG. 18, is stored in advance in the memory (not shown) of the driving/braking force controller 50, and the gain Kr1 is determined based on this table and the relative speed Vr.

As described above, when the accelerator pedal 81 is being depressed (when the accelerator operation flag Facc is "on"), the first target deceleration rate $\alpha^*1$ is 0 because L*1=L. In cases in which the absolute value of the change rate (degree of deceleration) of the first target deceleration rate $\alpha^*1$ calculated from Equation 10 is less than a specific first lower limit $\Delta\alpha^*1$, the absolute value of the change rate of the first target deceleration rate $\alpha^*1$ is set to the lower limit $\Delta\alpha^*1$. When the first target deceleration rate $\alpha^*1$ has been calculated, the process advances to step S460.

In step S460, a second target deceleration rate $\alpha^*2$ is calculated from Equation 11, based on the second headway distance threshold L*2 calculated in step S420 and based on the headway distance L from the preceding vehicle detected by the laser radar 70.

$$\alpha^*2 = Kv \times Kr2 \times (L^*2 - L) \quad \text{(Equation 11)}$$

The value Kr2 is the gain for calculating the second target deceleration force produced in the host vehicle, and the value of the second target deceleration rate $\alpha^*2$ when the accelerator pedal 81 is not being depressed (when the accelerator operation flag Facc is "off" and the target drive force $\tau^*t$ is set to 0). The second target deceleration rate $\alpha^*2$ is a positive value during acceleration and a negative value during deceleration.

Figure 6:
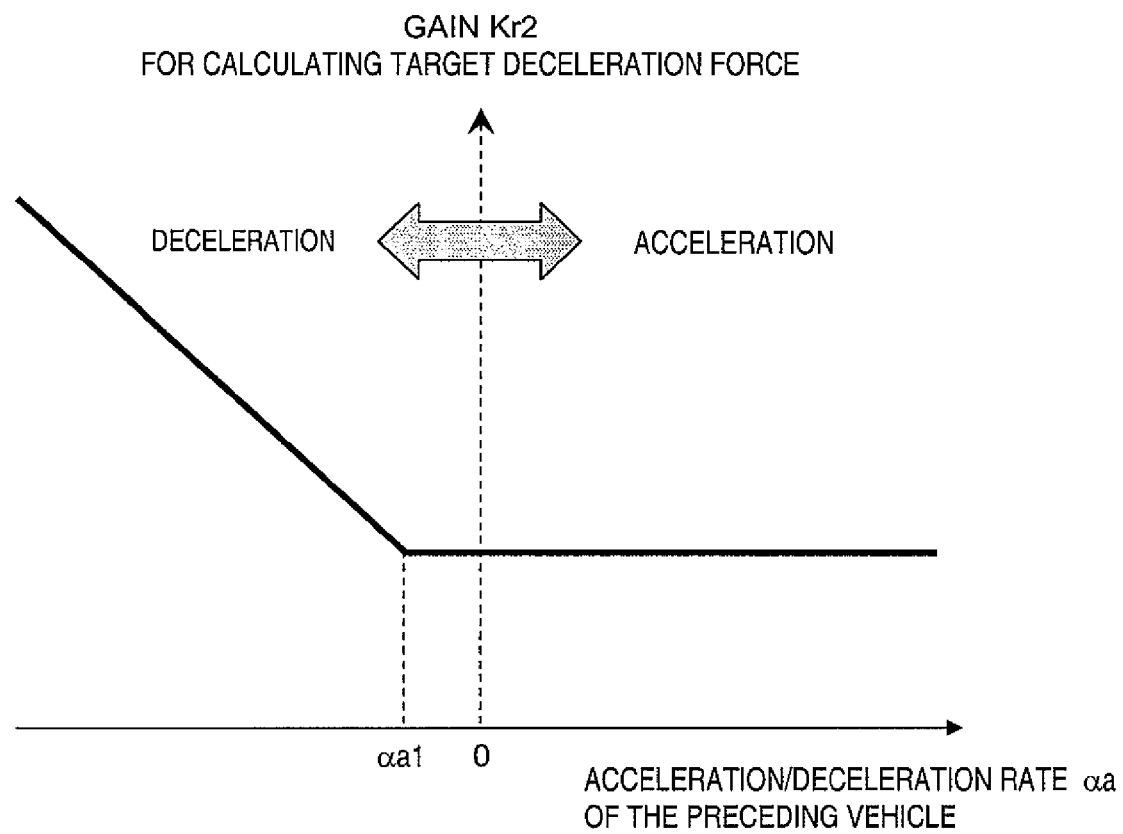
FIG. 6 is a diagram showing the relationship between the gain Kr2 and the acceleration/deceleration speed $\alpha a$ of the preceding vehicle.

FIG. 6 is a diagram showing the relationship between the acceleration/deceleration rate $\alpha a$ of the preceding vehicle and the gain Kr2. As shown in FIG. 6, the lower the acceleration/deceleration rate $\alpha a$ of the preceding vehicle; i.e., the greater the rate of deceleration of the preceding vehicle is, the greater of the gain Kr2 is. The greater the rate of deceleration of the preceding vehicle is, the greater the rate of deceleration of the host vehicle can also be set during deceleration braking. The value of the gain Kr2 is set to a specific value (e.g., 1) in a region in which the acceleration/deceleration rate $\alpha a$ of the preceding vehicle is greater than a specific acceleration/deceleration rate $\alpha a1$. A table specifying the relationship between the acceleration/deceleration rate $\alpha a$ of the preceding vehicle and the gain Kr2, as shown in FIG. 6, is stored in advance in the memory (not shown) of the driving/braking force controller 50, and the gain Kr2 is determined based on this table and the acceleration/deceleration rate $\alpha a$ of the preceding vehicle.

When the absolute value (degree of deceleration) of the rate of change of the second target deceleration rate $\alpha^*2$ calculated from Equation 11 is greater than a specific second upper limit $\Delta\alpha^*2$ ($\Delta\alpha^*2 > \alpha^*1$), the absolute value of the rate of change of the second target deceleration rate $\alpha^*2$ is limited so as to be equal to or less than the upper limit $\Delta\alpha^*2$. Increasing the second upper limit $\Delta\alpha^*2$ past the first upper limit $\Delta\alpha^*1$ moderately controls deceleration when the headway distance L is less than the first headway distance threshold L*1. Deceleration can be controlled to quickly move the vehicle to an appropriate headway distance when the headway distance is less than the second headway distance threshold L*2 (L*2<L*1). When the second target deceleration rate $\alpha^*2$ is calculated, the process advances to step S470.

In step S470, the final target deceleration rate $\alpha^*$ produced in the vehicle is determined. In this step, the first target deceleration rate $\alpha^*1$ calculated in step S450 is compared with the second target deceleration rate $\alpha^*2$ calculated in step S460, and the smaller deceleration rate; i.e., the target deceleration having a greater degree of deceleration is set as the final target deceleration rate $\alpha^*$. In this case as well, the final target deceleration rate $\alpha^*$ is a positive value during acceleration and a negative value during deceleration.

In step S480, which follows step S470, braking is controlled based on the final target deceleration rate $\alpha^*$. First, as shown in Equation 12, a target deceleration rate $\alpha^*$brk produced by the brakes is calculated by subtracting a deceleration rate $\alpha^*$eng produced by engine braking from the final target deceleration rate $\alpha^*$ determined in step S470.

$$\alpha^*\text{brk} = \alpha^* - \alpha^*\text{eng} \quad \text{(Equation 12)}$$

The values $\alpha^*$, $\alpha^*$brk, and $\alpha^*$eng are all positive during acceleration and negative during deceleration. When the accelerator pedal 81 is being depressed (when the accelerator operation flag Facc is on), $\alpha^*$brk=0 because $\alpha^*=\alpha^*$eng=0.

Next, a target brake fluid pressure P* is calculated from Equation 13 based on the calculated target deceleration rate $\alpha^*$brk.

$$P^* = -(Kb \times \alpha^*\text{brk}) \quad \text{(Equation 13)}$$

The value Kb is the gain for converting the target deceleration rate into a target brake fluid pressure, and is set in advance based on the host vehicle specifications. When the accelerator pedal 81 is being depressed (when the accelerator operation flag Facc is on), P*=0 because $\alpha^*$brk=0.

The pressure control unit 5 is then instructed to create a brake fluid pressure based on the calculated target brake fluid pressure P*. Having received this instruction, the pressure control unit 5 creates a brake fluid pressure based on the target brake fluid pressure P*, and supplies the brake fluid pressure to the wheel cylinders 12, 22, 32 and 42. Control for decelerating the vehicle is thereby implemented if the driver is not operating the accelerator pedal 81 when the headway distance L is less than both the first headway distance threshold L*1 and the second headway distance threshold L*2. When the driver is operating the accelerator pedal 81, deceleration control is not implemented because the target brake fluid pressure P*=0.

Upon being completed in step S480, the process returns to step S400. The processes in steps S400 through S480 are thereafter repeated The process executed by the driving/braking force controller 50 in step S401 will now be described. In step S401, the torque or force characteristic correction control is implemented for changing the relationship between the actuation amount of the accelerator pedal 81 and the drive force. The processing for changing the relationship between the actuation amount of the accelerator pedal and the drive force will be described with reference to the flowchart shown in FIG. 7.

Figure 7:
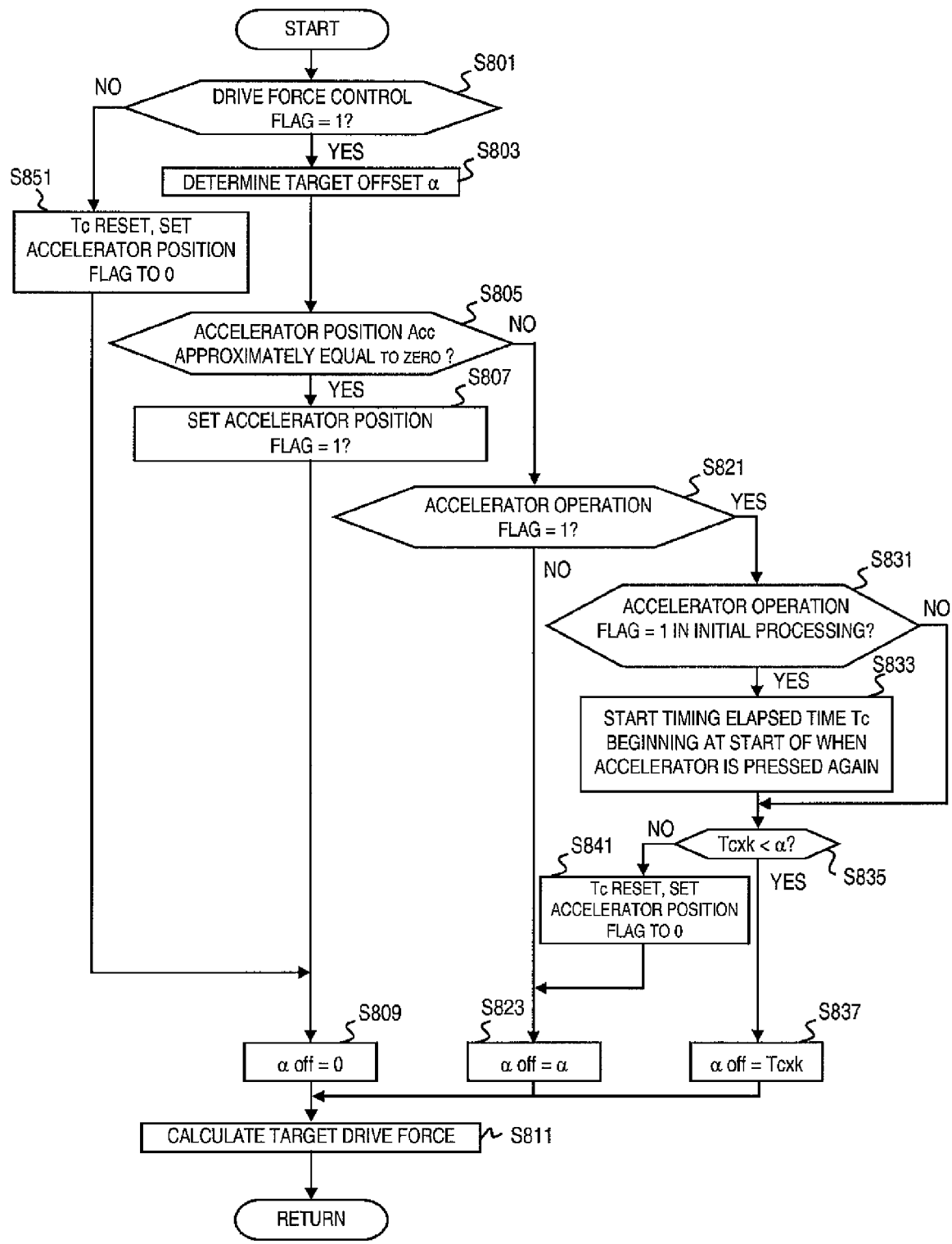
FIG. 7 is a flowchart showing the processing executed for controlling the changes in the relationship between the target drive force and the position of the accelerator pedal.

In step S801 of the flowchart shown in FIG. 7, the driving/braking force controller 50 determines whether the drive force control flag Ft is set to 1. The drive force control flag Ft is set to 1 under prescribed conditions when a preceding vehicle is sensed by the laser radar 70. In other situations, and the flag is set to 0 when such prescribed conditions have not been satisfied. The prescribed conditions are not limited to the above conditions. Examples of the prescribed conditions also include cases in which the headway distance from the preceding vehicle is equal to or less than a prescribed threshold (e.g., primary deceleration control distance threshold L*1), and cases in which the relative speed has become equal to or greater than a prescribed threshold in the approaching direction. The drive force control flag Ft can be set to 0 when the operator has indicated an intention to change lanes (e.g., when the turn signal has been switched on), or when the lateral displacement of the preceding vehicle with respect to the host vehicle is equal to or greater than a prescribed threshold. The drive force control flag Ft can be set to 1 when the headway maintenance assist system has merely become operable (when an operating switch (not shown) has been turned on). In such a case, when the accelerator pedal reactive force cannot be applied due to a failure of the accelerator pedal actuator 80 (i.e., when the headway maintenance assist system is inoperable), the drive force control flag Ft is set to 0. When the response is in the affirmative in step S801, the process advances to step S803. When, on the other hand, the response is in the negative in step S801, the process advances to step S851.

When the accelerator position is at a low setting, i.e., when the accelerator pedal 81 is depressed only slightly, it is difficult for the driver to notice that a reactive force has been applied. For example, when the vehicle speed is low, the accelerator position is also generally at a low setting, as shown by the solid line in FIG. 8. In view of this situation, a drive force command value (target driving force) τ*t to be outputted to the drive force controller 60 is calculated in step S803 and later processes as described below, whereby the relationship between the accelerator position and the drive force is changed (corrected) so that the driver more readily feels the reactive force on the accelerator pedal 81, i.e., so that the accelerator pedal is pressed until a prescribed accelerator position at is reached.

However, when the relationship between the accelerator position and the drive force is changed so that the accelerator pedal 81 is pressed to a certain degree, the driver may experience a sensation of sluggish acceleration or other discomfort when the accelerator pedal 81 is pressed again after the driver has temporarily released pressure on the accelerator pedal 81. In view of this situation, when pressure on the accelerator is reduced until the accelerator position reaches substantially 0, the relationship between the accelerator position and the drive force is temporarily returned to the state that existed prior to change, and the driver does not experience a sensation of sluggish acceleration or other discomfort. Specifically, the correction of the relationship between the accelerator position and the drive force is temporarily stopped when pressure on the accelerator is reduced until the accelerator position reaches substantially 0.

Even after the relationship between the accelerator position and the drive force has been returned to the state that existed prior to the change, the relationship between the accelerator position and the drive force must be changed again so that the driver can perceive the reactive force of the accelerator pedal when a preceding vehicle is continuously sensed by the laser radar 70 or in other cases in which the drive force control flag Ft is continuously set to 1. In view of the above, the relationship between the accelerator position and the drive force in such a case is gradually returned to the state that existed after the change as described below.

Figure 8:
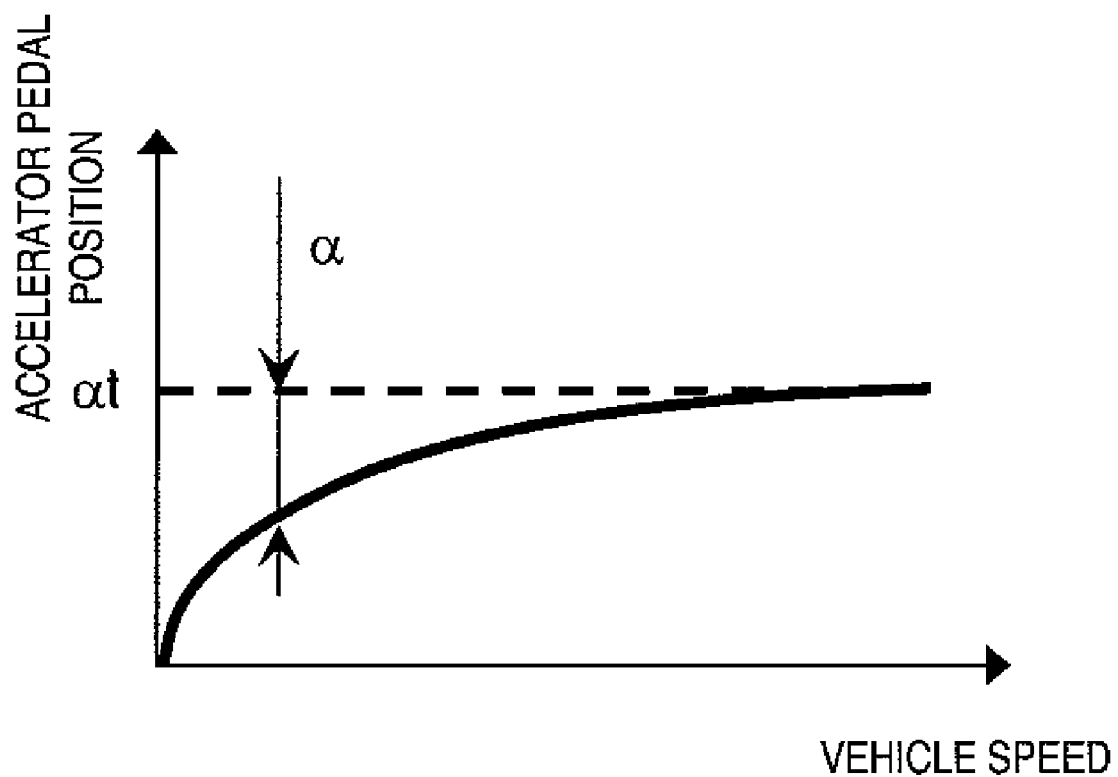
FIG. 8 is a diagram showing the relationship between the vehicle speed V and the accelerator pedal position Acc.

In step S803, the difference between the prescribed accelerator position at and the actual accelerator position is calculated from the relationship between the vehicle speed and accelerator position on the basis of the speed V of the host vehicle, and this is set as the target value (hereinafter referred to as "target offset value") a of the offset value of the accelerator position, as shown in FIG. 8.

After the target offset value α has been set in step S803, the process advances to step S805, and a determination is made as to whether pressure on accelerator has been reduced. Specifically, a determination is made as to whether pressure on the accelerator has been reduced by determining whether the accelerator position is substantially 0, i.e., whether the accelerator position Acc sensed by the accelerator position sensor 56 is equal to or greater than a prescribed accelerator position threshold Acc0. Pressure on the accelerator can be determined to have been reduced in cases in which the reduced value of the accelerator position is a prescribed value or greater, in cases in which the accelerator position is at a prescribed position or lower, in cases in which the reduction velocity of the operated value of the accelerator pedal is a prescribed velocity or higher, or in other cases.

When the response is affirmative in step S805, the process advances to step S807, and an accelerator position flag is set to 1. The accelerator position flag is a flag for determining in a later-described process whether pressure on the accelerator pedal has been temporarily reduced. When the accelerator position is substantially 0 as described above (an affirmative response in step S805), the flag is set to 1. The flag is set to 0 when pressure on the accelerator (e.g., the accelerator pedal 81) has not been reduced or when it is no longer required to determine whether pressure on the accelerator pedal has been reduced in a later-described process.

When the accelerator position flag has been set to 1 in step S807, the process advances to step S809. The offset value αoff of the accelerator position is set to 0 regardless of the offset target value α of the accelerator position, and the process advances to step S811. In step S811, the calculated offset value αoff is subtracted from the current accelerator position Acc, and the drive force corresponding to the accelerator position after the offset value αoff has been subtracted is set as the target driving force τ*t.

Since the offset value αoff is 0 when step S811 following step S807, the drive force corresponding to the current accelerator position Acc is calculated as the target driving force τ*t. As a result, the relationship between the accelerator position and the drive force is not changed. When the target driving force τ*t has been calculated in step S811, the process advances to step S410 of the flowchart shown in FIG. 2.

When the response is negative in step S805, the process advances to step S821, and a determination is made as to whether the accelerator position flag has been set to 1. In step S821, a determination is made, based on the accelerator position flag, as to whether pressure on the accelerator pedal 81 has been temporarily reduced. In the case that pressure on the accelerator pedal 81 has been temporarily reduced, the accelerator position flag is set to 1, and the response is therefore affirmative in step S821. The accelerator position flag is set to 0, and the response is therefore negative in step S821, as described above, in cases in which pressure on the accelerator has not been reduced and continues to be pressed, or in cases in which pressure on the accelerator pedal has been temporarily reduced but it is no longer required to determine whether pressure on the accelerator pedal 81 has been reduced.

When the response is negative in step S821, the process advances to step S823, the offset value αoff of the accelerator position is set to the offset target value α, and the process advances to step S811. In step S811, the calculated offset value αoff is subtracted from the current accelerator position Acc, and the drive force corresponding to the accelerator position after the offset value αoff has been subtracted is set to be the target driving force τ*t. In other words, the relationship between the current accelerator position Acc and the drive force is changed from the ordinary drive force/accelerator relationship or first drive force/accelerator actuation relationship (graph 201) shown by the broken line in FIG. 9 to a corrected drive force/accelerator relationship or second drive force/accelerator actuation relationship (graph 202) shown by the solid line. The generated drive force is thereby reduced with respect to the current accelerator position Acc. Therefore, the drive force desired by the driver can no longer be obtained unless the driver presses considerably more than usual on the accelerator pedal 81. For this reason, the driver will press more forcefully on the accelerator pedal 81.

Figure 9:
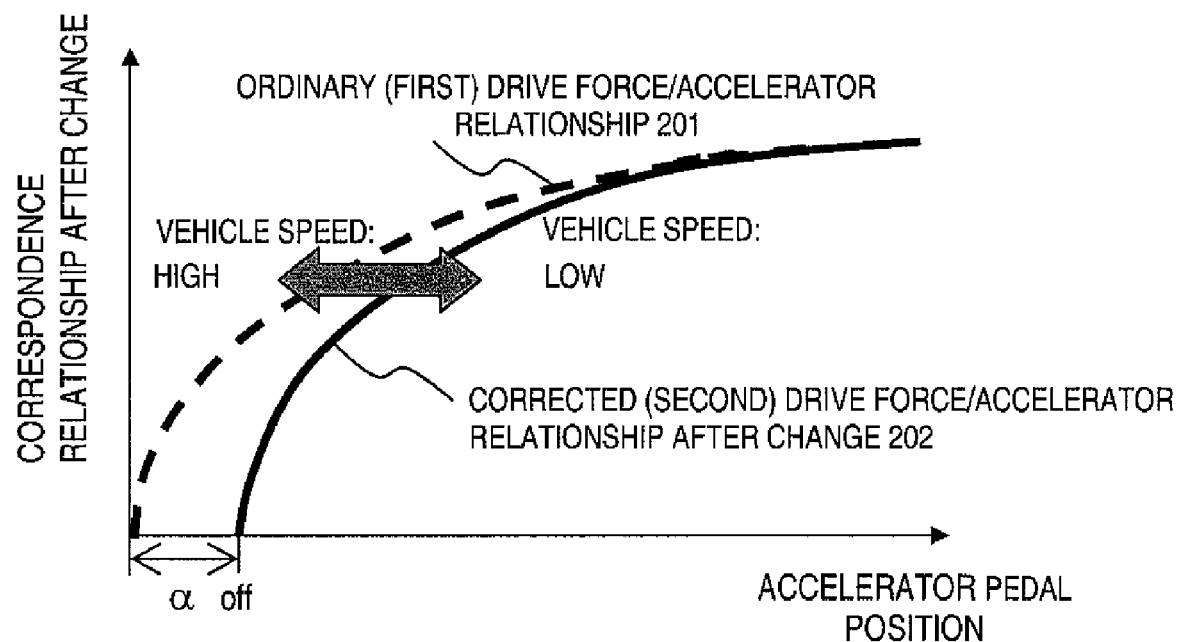
FIG. 9 is a diagram showing the relationship between the accelerator pedal position Acc and the target drive force $\tau^*t$ after a change in the drive force/accelerator relationship.

In the graph 202 of the changed drive force/accelerator relationship shown by the solid line in FIG. 9, a match is established with the graph 201 of the ordinary or first drive force/accelerator relationship shown by the broken line when the accelerator position is increased. Therefore, the same drive force as usual can be obtained when the driver has depressed the accelerator pedal to a considerable degree, such as when passing the preceding vehicle.

When the value obtained by subtracting the offset value αoff from the current accelerator position Acc is 0 or less, the target driving force τ*t is set to 0.

When the response is affirmative in step S821, i.e., when pressure on the accelerator pedal 81 has been temporarily reduced, the process advances to step S831. In step S831, a determination is made as to whether the accelerator position flag has been set from 0 to 1 and whether the current cycle is the first processing cycle, i.e., whether the pressure on the accelerator pedal 81 has again been pressed, and the current cycle is the first processing cycle. When the response is affirmative in step S831, the process advances to step S833, and the elapsed time Tc is reset in order to measure the time that elapses when the pressure on the accelerator pedal 81 has been temporarily reduced and the accelerator pedal 81 has been pressed again. The procedure for timing the elapsed time Tc is then started and the process advances to step S835. In the case that the response is negative in step S831, the process skips step S833 and advances to step S835 because step S833 has already been executed once and the procedure for timing the elapsed time Tc has been started.

Figure 10:
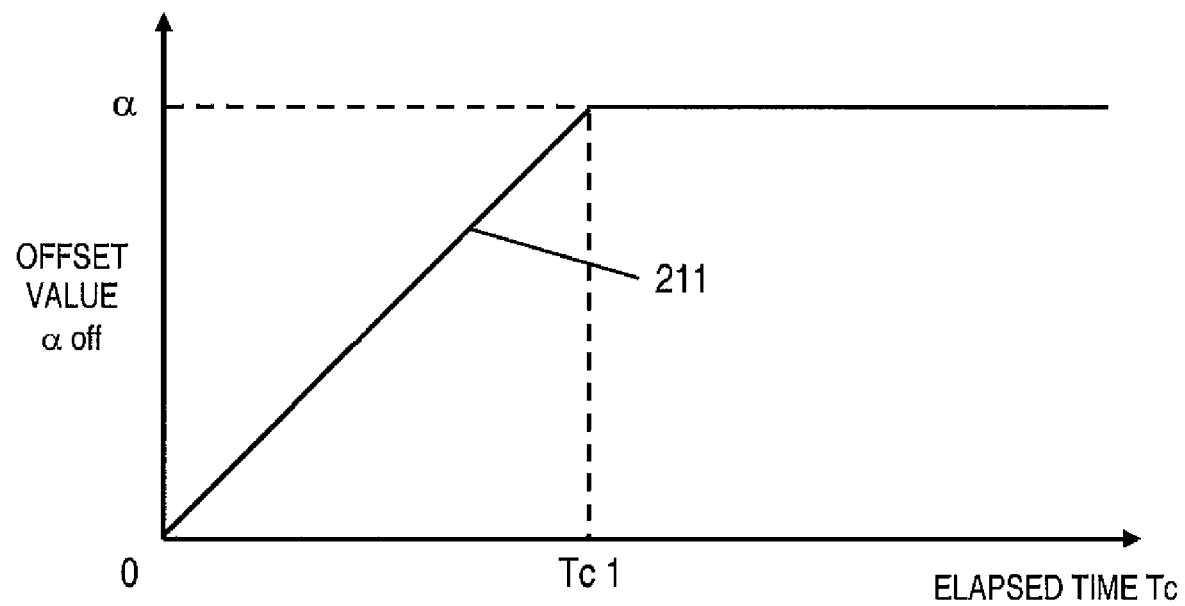
FIG. 10 is a diagram showing the relationship between the elapsed time Tc and the offset value $\alpha off$.

In step S835, a determination is made as to whether the product of the elapsed time Tc and the coefficient k is less than the offset value αoff. As used herein, the coefficient k is a coefficient that has been set in advance in order to calculate the offset value αoff as the value that corresponds to the elapsed time Tc. Specifically, when the offset value αoff is made to be proportional to the elapsed time Tc, the coefficient k corresponds to the slope of the graph 211, which shows the relationship between the offset value αoff and the elapsed time Tc, as shown in FIG. 10. When the product of the elapsed time Tc and the coefficient k is less than the offset value α, i.e., when the response is in the affirmative in step S835, the process advances to step S837, the product of the elapsed time Tc and the coefficient k is set as the offset value αoff, and the process advances to step S811.

Figure 11:
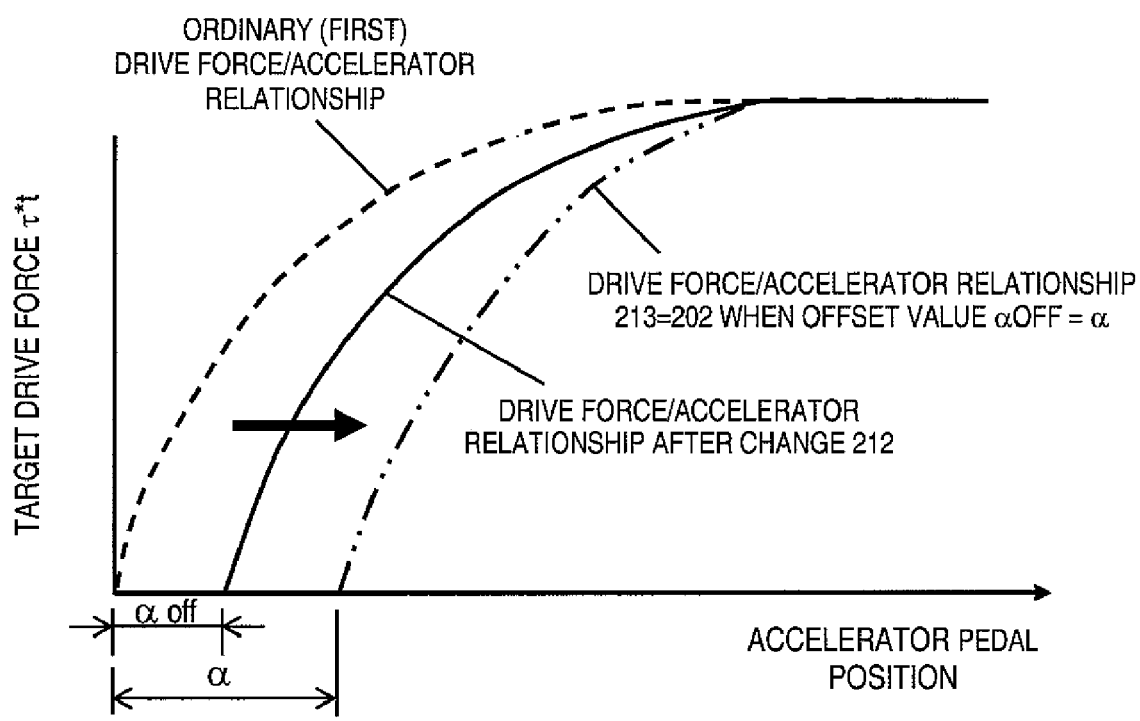
FIG. 11 is a diagram showing the relationship between the accelerator position Acc and the target driving force $\tau^*t$.

In step S811, the calculated offset value αoff is subtracted from the current accelerator position Acc, and the drive force corresponding to the accelerator position after the offset value αoff has be subtracted is set as the target driving force τ*t. Specifically, the relationship between the accelerator position Acc and the drive force is changed from the ordinary drive force/accelerator relationship (graph 201) shown by the broken line in FIG. 11 to the drive force/accelerator relationship shown by the solid line (graph 212). The graph 212 of the drive force/accelerator relationship shown by the solid line gradually moves to the right side of the diagram in accordance with the elapsed time Tc. In the same manner as described above, as the accelerator position increases, the graph 212 of the drive force/accelerator relationship shown the by solid line in FIG. 11 comes to match the curve showing the ordinary drive force/accelerator relationship shown by the broken line.

The product of the elapsed time Tc and the coefficient k becomes equal to the offset target value α when the fixed time interval Tc1 shown in FIG. 10 elapses. In this case, the offset value αoff becomes equal to the offset target value α, and the graph 212 of the drive force/accelerator relationship shown by the solid line in FIG. 11 therefore matches the graph 213 of the drive force/accelerator relationship shown by the alternate long and two short dashes line. The graph 213 is a drive force/accelerator relationship that is valid when the offset value αoff is set as the offset target value α, and is equal to the graph 202 shown in FIG. 9. Specifically, when a fixed time interval Tc1 elapses, the relationship between the accelerator position and the drive force will again return to the corrected relationship between the accelerator position and the drive force that existed prior to the driver reducing pressure on the accelerator pedal, and there is therefore no need to make the offset value αoff to be greater than the offset target value α.

Therefore, when the product of the elapsed time Tc and coefficient k is equal to or greater than the offset target value cc, i.e., when the response is negative in step S835, the process advances to S841, the elapsed time Tc is reset, the accelerator position determination flag is set to 0, the process advances to step S823, and the offset value αoff of the accelerator position is set to the offset target value α. The offset value αoff of the accelerator position is thereby set to the offset target value α after a fixed time interval Tc1 has elapsed from the moment in which the accelerator pedal 81 is pressed again after the pressure on the accelerator pedal 81 has been released, as shown in FIG. 10.

After step S841 is executed, the calculated offset value αoff is subtracted from the current accelerator position Acc in step S811, and the drive force corresponding to the accelerator position after the offset value αoff has been subtracted is set as the target driving force τ*t. In other words, the relationship between the accelerator position Acc and the drive force has been changed for a second time to the drive force/accelerator relationship (graph 202) shown by the solid line in FIG. 9.

A negative response is obtained in step S801 when the relationship between the accelerator position and the drive force described above is not required to be changed, i.e., when the drive force control flag Ft is set to 0. When a negative response is obtained in step S801, the process advances to step S851, the elapsed time Tc is reset, the accelerator position determination flag is set to 0, and the process advances to step S809. In step S809, the offset value αoff of the accelerator position is set to 0 and the process advances to step S811. In step S811, the calculated offset value αoff is subtracted from the current accelerator position Acc, and the drive force corresponding to the accelerator position after the offset value αoff has been subtracted is set as the target driving force τ*t.

When step S811 is executed after a negative response has been obtained in step S801, the drive force that corresponds to the current accelerator position Acc is calculated as the target driving force τ*t because the offset value αoff is set to 0. As a result, the relationship between the accelerator position and the drive force is not changed.

Figure 12:
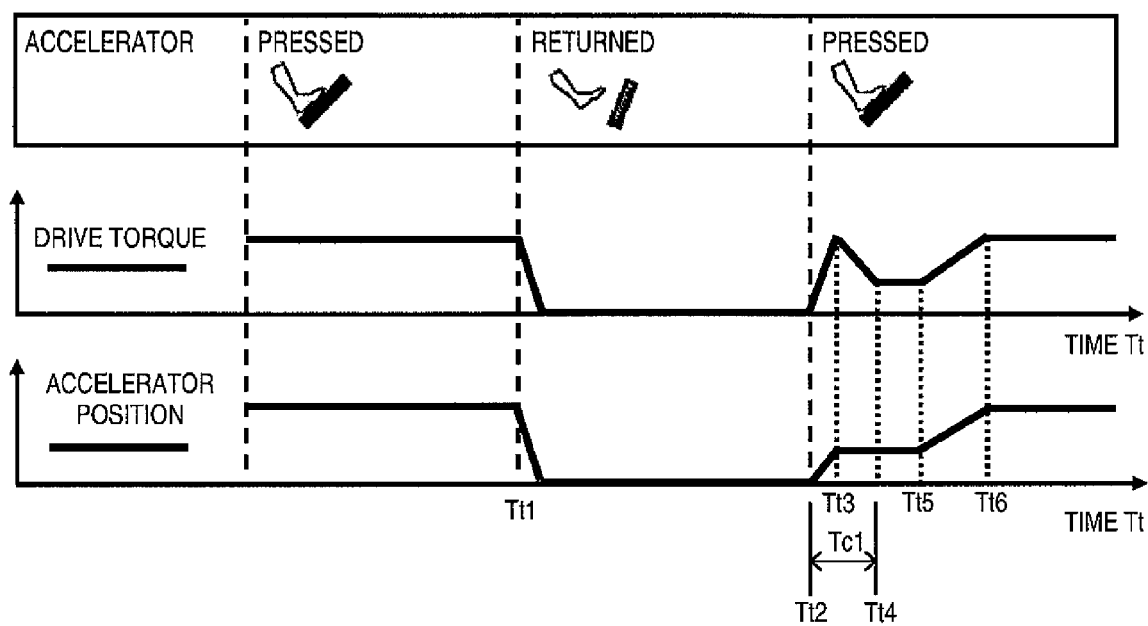
FIG. 12 is a diagram showing the change over time in the relationship between the accelerator position Acc and the drive force $\tau w$ on the wheel shafts.

With a headway maintenance assist system thus configured, the relationship between the accelerator position and the drive force is modified as described above so that the accelerator pedal 81 is depressed to a certain degree, and when the accelerator pedal 81 is thereafter returned, the drive force changes in the manner shown in FIG. 12, for example. The drive force control flag Ft is set to 1 and the relationship between the accelerator position and the drive force is changed so that the accelerator pedal 81 is depressed to a certain degree. The drive force is then set to 0 when the accelerator pedal 81 is returned at time Tt1 and the current accelerator position Acc is set to 0.

Since, as described above, the relationship between the accelerator position and the drive force is returned to the pre-change state by setting the current accelerator position Acc to substantially 0, the drive force increases in accordance with the current accelerator position Acc when the accelerator pedal 81 is thereafter depressed over a period that extends from time Tt2 to time Tt3. In the case that the elapsed time from time Tt2 to time Tt3 is less than the fixed time interval Tc1 shown in FIG. 10, the drive force gradually decreases from time Tt3 to time Tt4 when the current accelerator position Acc remains constant from time Tt3. The time Tt4 is the time at which the time interval Tc1 has elapsed from time Tt2.

As long as the accelerator position Acc is fixed in the interval from time Tt4 to time Tt5, the drive force will also be fixed. When the accelerator is further depressed in the period that extends from time Tt5 to time Tt6, the drive force will also increase in accordance with the increase in the accelerator position Acc.

According to the headway maintenance assist system of the illustrated embodiment, the following effects are obtained.

(1) When the drive force control flag Ft is set to 1, the relationship between the current accelerator pedal position Acc and the drive force is changed to a drive force/accelerator relationship that is different than an ordinary drive force/accelerator relationship. The manner in which the accelerator is manipulated by the driver can thereby be influenced so as to establish an accelerator pedal position that allows the driver to more readily feel the reaction force of the accelerator pedal 81. Therefore, the driver can be reliably alerted by applying a reaction force to the accelerator pedal 81.

(2) The generated drive force is configured to decrease with respect to the accelerator pedal position Acc. Therefore, when the drive force control flag Ft is set to 1, the drive force will decrease as long as the accelerator pedal 81 is not depressed with a greater force. Since the driver can be urged to press the accelerator pedal 81 with greater force, the driver can be made to notice with greater certainty that a reaction force has been applied to the accelerator pedal 81.

(3) The offset amount of the current accelerator pedal position Acc is set and the relationship between the current accelerator pedal position Acc and the drive force is changed (corrected) by subtracting the offset value α from the current accelerator pedal position Acc. The control content can thereby be simplified and the reliability of control in the driving/braking force controller 50 can be improved.

(4) When the value obtained by subtracting the offset value α from the current accelerator pedal position Acc is 0 or less, the target drive force τ*t is set to 0. Therefore, the drive force cannot be obtained when the current accelerator pedal position Acc is lower than the accelerator pedal position corresponding to the offset value α. Since the driver can thereby be urged to press the accelerator pedal 81 until at least the accelerator pedal position corresponding to the offset value α is reached, the driver can be made to notice with greater certainty that a reaction force has been applied to the accelerator pedal.

(5) An increase the accelerator pedal position causes the relationship between the accelerator pedal position Acc and the drive force to assume the ordinary drive force/accelerator relationship that existed before the offset value α was subtracted from the current accelerator pedal position Acc. The same drive force as usual can thereby be obtained when the driver has pressed on the accelerator pedal 81 with considerable force, as in the case of passing a preceding vehicle. Therefore, the driver's intention to accelerate can be given greater consideration.

(6) When pressure on the accelerator is reduced, the correction of the relationship between the accelerator position and the drive force is temporarily stopped. The relationship between the accelerator position and the drive force is thereby returned to the state that existed prior to the change, and the driver can be prevented from experiencing a sensation of sluggish acceleration or other discomfort when the accelerator pedal 81 is depressed again.

(7) When the correction of the relationship between the accelerator position and the drive force is temporarily stopped and the accelerator pedal 81 is thereafter depressed again, the offset value αoff is gradually increased and the relationship is gradually restored to the state that existed before the correction has been stopped. The manner in which the accelerator is manipulated by the driver can thereby be influenced so as to establish an accelerator position that allows the driver to more readily feel the reactive force of the accelerator pedal 81 even when the correction has been temporarily stopped. Therefore, the driver can be reliably alerted by the application of a reactive force to the accelerator pedal even 81 in cases in which the accelerator pedal 81 is depressed again after the driver has reduced pressure on the accelerator.

(8) When the accelerator position has been essentially set to 0, pressure on the accelerator is determined to have been reduced. Since it can be reliably determined that the driver has reduced pressure on the accelerator, the relationship between the accelerator position and the drive force can be reliably returned to the pre-changed state in preparation for the driver to thereafter depress the accelerator pedal, and the driver's intention to accelerate can be taken into account. The same effect can also be obtained in cases in which pressure on the accelerator is determined to have been reduced when the reduced value of the accelerator position is a prescribed value or higher, in cases in which the accelerator position is a prescribed position or lower, in cases in which the velocity of the decreasing operated value of the accelerator pedal is a prescribed velocity or higher, and in other cases.

In the description above, no particular mention was made regarding the allowable value of the coefficient k, and the coefficient k may be suitably varied. For example, the slope of the graph showing the relationship between the offset value scoff and the elapsed time Tc is increased by increasing the coefficient k, as indicated by the graph 214 shown in FIG. 13. In this manner, the coefficient k is suitably modified in order to vary the time required to again return the relationship between the accelerator position and the drive force to the corrected state after the correction has been temporarily stopped.

The coefficient k may, for example, be suitably modified in the following manner in accordance with the running condition of the host vehicle. The coefficient k increases with reduced velocity V of the host vehicle or reduced headway distance L from the preceding vehicle, as well as increased relative speed Vr. The drive force is thereby more rapidly changed toward lower values, which is preferred in terms of safety.

Figure 13:
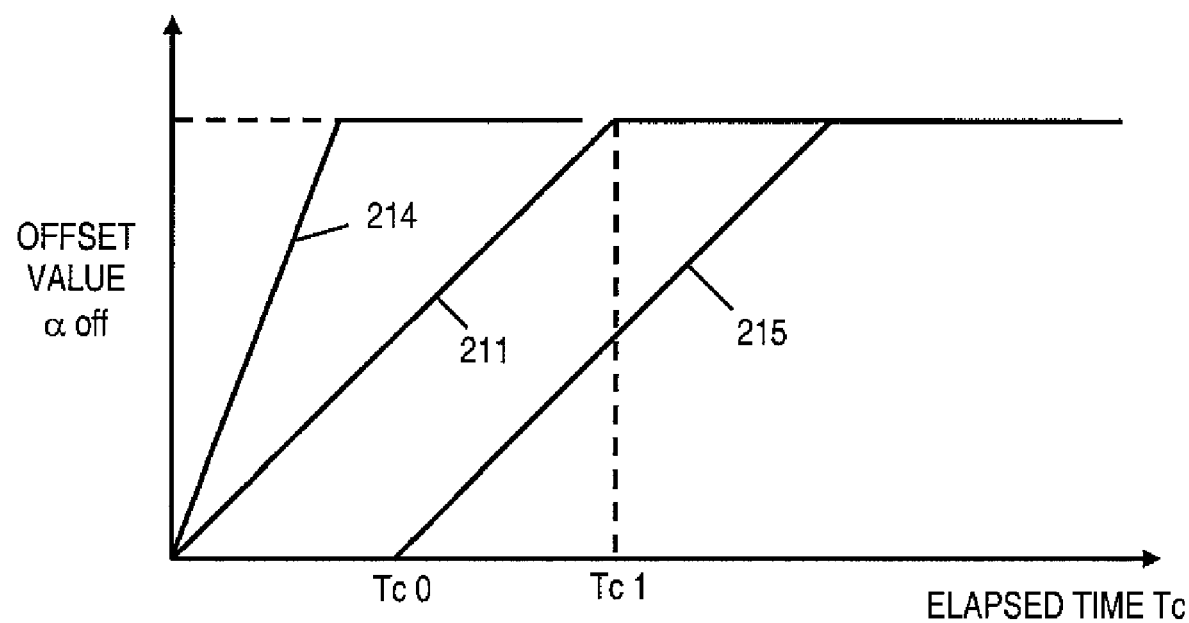
FIG. 13 is a diagram showing the relationship between the elapsed time Tc and offset value $\alpha off$.

The offset value $\alpha a$ may be set to 0 in the interval in which the elapsed time Tc passes through the prescribed time Tc0, as in the graph 215 shown in FIG. 13. Such a configuration allows the correction procedure to be suspended and the driver's responsiveness to acceleration to be improved in the interval in which the prescribed time Tc0 elapses after pressure on the accelerator pedal 81 is temporarily reduced and then resumed.

Figure 14:
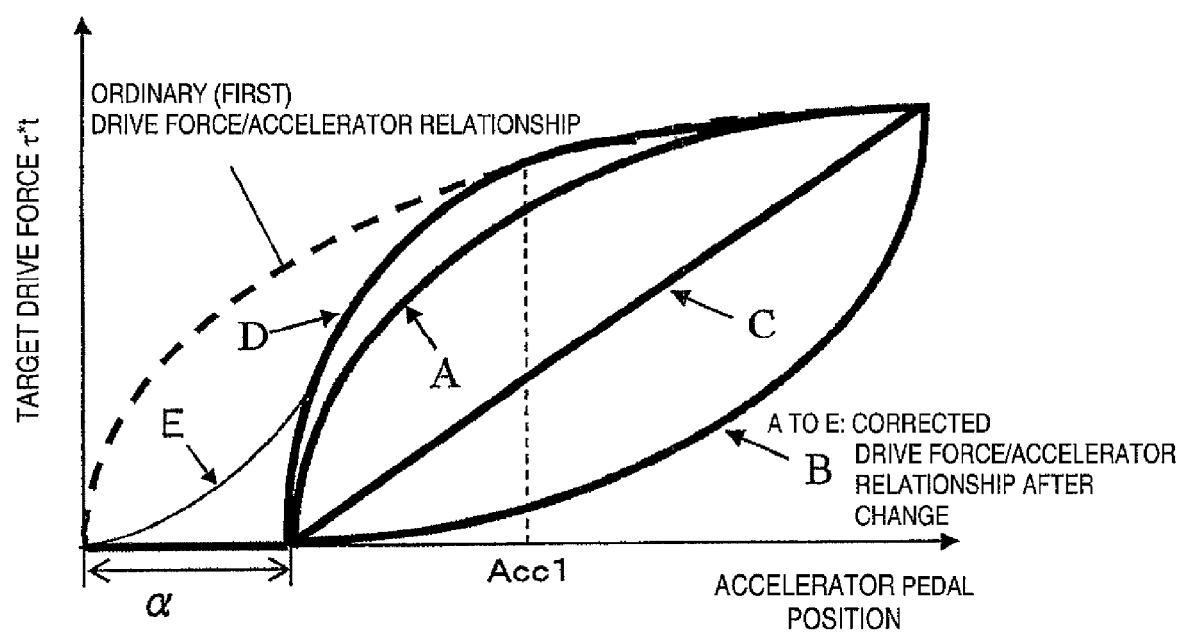
FIG. 14 is a diagram showing another example of the relationship between the accelerator pedal position Acc and the target drive force $\tau^*t$.

The relationship between the current accelerator pedal position Acc and the drive force is not limited to the description above. The relationship can be set so that various characteristics such as those shown by the curves A to E of FIG. 14 are achieved, for example. When, for example, the drive force/accelerator relationship between the drive force and the changed accelerator pedal position Acc in FIG. 9 described above is the curve A, the drive force corresponding to the accelerator pedal position can be set so as to be further reduced as shown by the curve B. Although the accelerator pedal 81 responds more slowly when operated by the driver in this case, the acceleration characteristics of the host vehicle are moderated.

The drive force can also be linearly output with respect to the accelerator pedal position, as shown by the curve C. In this case, the acceleration characteristics are more apparent to the driver. When the accelerator pedal position exceeds the accelerator pedal position Acc1, a match can be achieved with the curve that shows the ordinary drive force/accelerator relationship indicated by the broken line, as shown by curve D. In this case, since a match is achieved with the curve that shows the ordinary drive force/accelerator relationship indicated by the broken line from an accelerator pedal position that is lower than in the case of curve A, the acceleration characteristics can be made to more closely reflect the acceleration intentions of the driver. The positions of the curves shown in FIG. 14 are preferably modified from D to A, A to C, and C to B as the degree of approach between the host vehicle and preceding vehicle increases, i.e., as the headway distance is reduced, or as the relative speed with the preceding vehicle increases in the approaching direction. Also, the curves preferably change in the same manner with a reduction in the vehicle speed V. The drive force characteristics that are in accordance with the vehicle speed and the degree of approach with the preceding vehicle can be obtained by modifying curves in this manner, and the driver can more readily notice the application of reaction force on the accelerator pedal 81.

In the description above, the target drive force $\Xi^*t$ is set to 0 when the accelerator pedal position is less than the offset value $\alpha$, but even when the accelerator pedal position is less than the offset value $\alpha$, as shown by the curve E indicated by the thin solid line, the target drive force $\tau^*t$ can be set to a value that is greater than 0, i.e., so that some drive force can be obtained. The curve can be modified in the direction in which the target drive force is reduced with respect to the accelerator pedal position as the degree of approach to the preceding vehicle increases in the same manner as described above with reference to curve E. Specifically, as the vehicle speed is reduced, the curve E can be modified in the direction of the arrow (from E1 to E3) as the degree of approach increases, as shown in FIG. 12.

Figure 16:
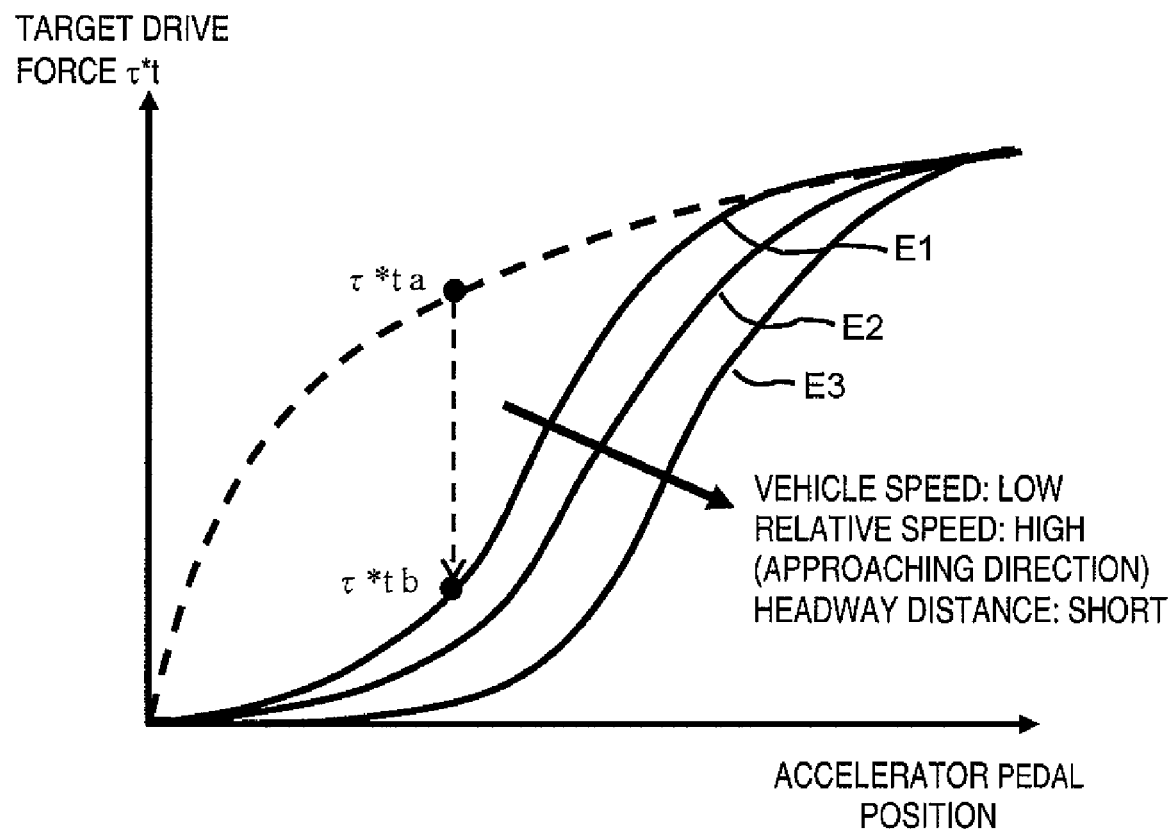
FIG. 16 is a diagram showing an example of the relationship between the accelerator pedal position Acc and the target drive force τ*t that illustrates the relationship between the speed V of the host vehicle and the upper limit Ta_max.

The target drive force $\tau^*ta$ is reduced (torque down) to $\tau^*tb$ by modifying the map showing the relationship between the accelerator pedal position Acc and the drive force, but the rate of change (the rate at which the target drive force is changed) at that time can also be modified in accordance with the vehicle speed, the degree of approach (relative speed and headway distance), and other factors, as shown in FIG. 16. Specifically, when the vehicle speed is low, the rate of change of the target drive force is preferably increased in the case that the degree of approach is considerable (the headway distance is low and the relative speed is high in the direction of approach).

After the relationship between the accelerator pedal position and the target drive force has been compensated, the curve is returned to its original state when the drive force control flag Ft has become 0 in step S841 of FIG. 7. At this point, since the drive force will increase even if the accelerator pedal position remains constant, the driver may be caused to feel uncomfortable when the torque is suddenly increased. Therefore, the torque is preferably increased at a speed that is less than the speed at which the torque is reduced in the manner described above. It is sometimes better to increase the torque at a lower rate of change in accordance with conditions. In cases in which, for example, the relationship between the accelerator pedal position and the drive force is returned to its original state when the preceding vehicle is no longer being detected by the laser radar 70, it is better to further reduce the rate of change of the torque as the headway distance to the preceding vehicle becomes shorter, or as the relative speed in the direction of approaching the preceding vehicle becomes greater. When traffic lanes are narrow, when the number of lanes of the road being traveled is few, and when a congested road is being traveled, the characteristics can be set so that the rate of change of the torque is reduced and acceleration is moderated in rain, snow, or other bad weather, at night, or at other times. Such a configuration allows the drive force to be changed without making the driver uncomfortable.

Figure 15:
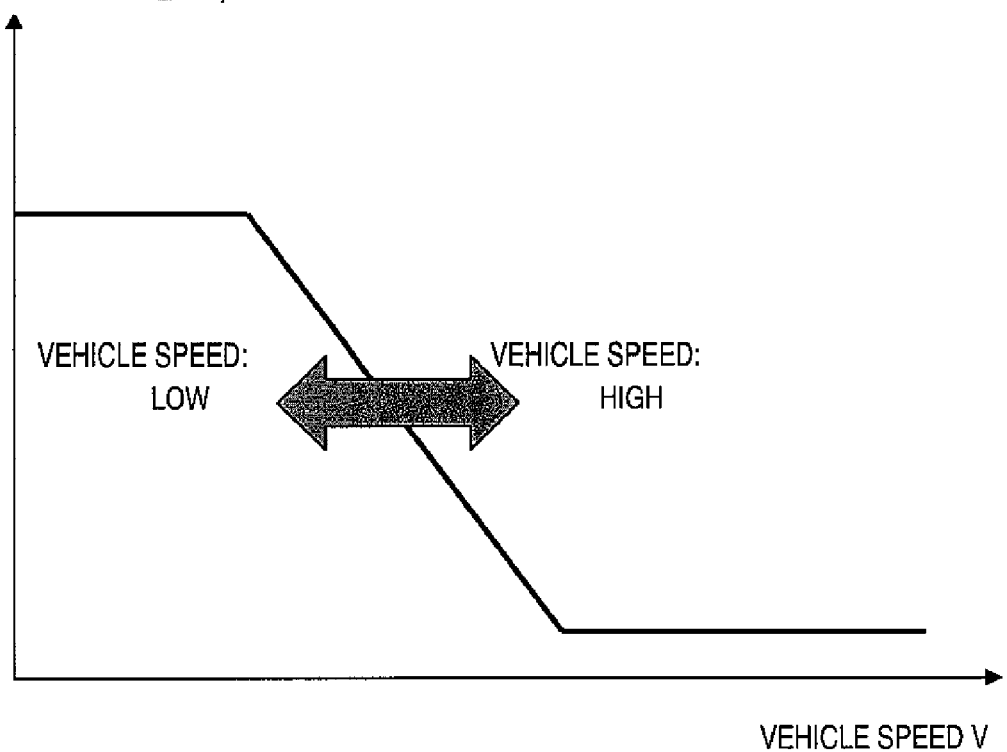
FIG. 15 is a diagram showing an example of the relationship between the speed V of the host vehicle and the headway distance threshold parameter (i.e., the upper limit Ta_max)

The present invention is not limited to the embodiments described above. In the illustrated embodiment, for example, the parameter Tr1 Ta for calculating the transient term $L^*r1$ $L^*a$ of the first headway distance threshold was calculated using Equation 2 but an upper limit Ta_max can be established for the calculated value to limit the maximum value, and a lower limit value can also be established to limit the minimum value. The maximum value can be set in accordance with the speed V of the host vehicle, for example. FIG. 15 is a diagram showing an example of the relationship between the speed V of the host vehicle and the upper limit Ta_max. In the same manner, in this modification, upper and lower limit values can be established for the parameter Tr2 for calculating the transient item L*r2 of the second headway distance threshold.

Also, an upper limit $\alpha^*1_{max}$ can be assigned to the first target deceleration rate $\alpha^*1$, and an upper limit $\alpha^*2_{max}$ ($\alpha^*2_{max} > \alpha^*1_{max}$) can be assigned to the second target deceleration rate $\alpha^*2$.

In the illustrated embodiment, the map used for the target drive force was changed, but the present invention is not limited to such a configuration. Rather than changing the map when the target drive force is calculated from the detected value of the accelerator pedal position, the detected value of the accelerator pedal position can be corrected to calculate a virtual accelerator pedal position, and the target drive force can be calculated from the previous map based on the virtual accelerator pedal position. When the map showing the relationship between the accelerator pedal position and the target drive force is to be changed, the corrected map must be calculated with consideration given to the state of the transmission and other factors, but such computation is not required and the relationship between the accelerator pedal position and the target drive force can be easily corrected as long as the detected value itself of the accelerator pedal position is corrected and the virtual accelerator pedal position is calculated.

The steady item L*h2 of the second headway distance threshold in the illustrated embodiment was calculated based on the speed V of the host vehicle and the relative speed Vr, but the calculation can be made by multiplying a prescribed time and the speed of the preceding vehicle, or can be made based on at least one option selected from the speed of the host vehicle, the relative speed, and the speed of the preceding vehicle.

In the above-described embodiments, brake fluid pressure was supplied to the wheel cylinders to reduce the speed of the vehicle, but the vehicle can be caused to decelerate by using engine braking, downshifting, and other types of deceleration control.

In the illustrated embodiment, the deceleration can also be performed using engine braking when the headway distance L is less than the first headway distance threshold L*1, and the deceleration control can be performed by supplying brake fluid pressure to the wheel cylinders 12, 22, 32 and 42 when the headway distance is less than the second headway distance threshold L*2. In this case, the user can discern between deceleration control that is performed when the headway distance L is less than the first headway distance threshold L*1, and deceleration control that is performed when the headway distance L is less than the second headway distance threshold L*2.

In the illustrated embodiment described above, the acceleration pedal reaction force control was performed for applying reaction force to the acceleration pedal 81 as long as the driver was operating the acceleration pedal 81 when the headway distance L between the host vehicle and the preceding vehicle was less than the headway distance threshold L*. Another possibility is to vibrate the acceleration pedal 81 instead of applying reaction force to the acceleration pedal 81. Thus, the accelerator pedal actuator 80 can include a vibration imparting device that constitutes a haptic information conveying section that is configured and arranged to convey a risk potential to a driver as haptic information through the accelerator pedal 81.

In the illustrated embodiment, the larger target deceleration rate selected from the first target deceleration rate $\alpha^*1$ and the second target deceleration rate $\alpha^*2$ was set as the final target deceleration rate to carry out deceleration control of the vehicle. However, deceleration control of the vehicle can be carried out after the first target brake fluid pressure P*1 has been calculated based on the first target deceleration rate $\alpha^*1$, the second target brake fluid pressure P*2 has been calculated based on the second target deceleration rate $\alpha^*2$, and the larger of the two target brake fluid pressures has been set as the final target brake fluid pressure.

In the illustrated embodiment, the difference between the prescribed accelerator pedal position $\alpha t$ and the accelerator pedal position was calculated from the vehicle speed and the accelerator pedal position based on the host vehicle speed V, as shown in FIG. 13, and this difference was set to be the offset value $\alpha$ of the accelerator pedal position, but the present invention is not limited by this configuration. The prescribed accelerator pedal position at can be a constant value such as a position of 25%, and can be a value that corresponds to the headway distance L, the relative speed Vr, or another parameter.

The offset value $\alpha$ can be varied using a gear position of the transmission, the engine speed, the slope of the road surface, or other parameters. In the case that the offset value $\alpha$ is varied using a gear position of the transmission, a higher offset value can be used for a higher gear position, or an offset value $\alpha gr$ that corresponds to the gear position can be looked up in a map. In the case that the offset value $\alpha$ is modified using the engine speed, the offset value $\alpha$ can be increased as the engine speed is reduced, or an offset value $\alpha$ that corresponds to the engine speed can be looked up in a map. In the case that the offset value $\alpha$ is modified using the slope (inclination) of the road, the offset value $\alpha$ can be set higher on an uphill slope and lower on a downhill slope, whereby an unwanted situation can be prevented in which the host vehicle ceases to accelerate when the accelerator pedal position is low on an uphill slope.

A suitable offset value $\alpha$ can be calculated in accordance with the state of obstacles in the forward direction and the running condition of the host vehicle by setting the prescribed accelerator pedal position at and offset value $\alpha$, in such a manner. Since the relationship between the accelerator pedal position Acc and the drive force can thereby be changed in accordance with the state of obstacles in the forward direction and the running condition of the host vehicle, the driver can be appropriately alerted by the application of accelerator reaction force in accordance with the traveling environment.

In the headway maintenance assist system of the illustrated embodiment, the vehicle was caused to decelerate as long as the driver was not operating the accelerator pedal 81 when the headway distance L between the host vehicle and the preceding vehicle had become less than the first headway distance threshold L*1. However, the present invention is not limited to this configuration. The headway maintenance assist system of the illustrated embodiment can also be configured so that deceleration control does not occur even when the headway distance L between the host vehicle and the preceding vehicle has become less than the first headway distance threshold L*1 under certain running conditions.

When the drive force control flag Ft is set to 1 as described in the illustrated embodiment, a control routine whereby the relationship between the accelerator pedal position Acc and the drive force is changed to a drive force/accelerator relationship that is different from an ordinary drive force/accelerator relationship can be applied to a variety of apparatuses for alerting the driver by applying a reaction force to the accelerator pedal 81.

In the headway maintenance assist system of the illustrated embodiment, the relationship between the output torque of the engine 6 and the accelerator pedal position is changed by changing the relationship between the accelerator pedal position and the target drive force $\tau^*t$ outputted to the drive force controller 60, but the present invention is not limited to this configuration, and the relationship between accelerator pedal position and the drive force $\tau t$ in the wheel shafts can be changed, for example, by changing the gear ratio of an automatic transmission, changing the output torque of a motor (e.g., electric motor) other than the engine 6, or by making other changes.

In the illustrated embodiment, the laser radar 70 basically corresponds to the preceding vehicle detection section. The accelerator pedal position sensor 56 basically corresponds to the accelerator actuation amount detection section. The accelerator pedal actuator 80 basically corresponds to the actuation reaction force generation section and the operation reactive force generating section. The sensors 13, 23, 33, 43, and 52 to 56 and the laser radar 70 basically correspond to the running condition detecting section. The drive force controller 60 basically corresponds to the drive source control section. The driving/braking force controller 50 basically corresponds to the accelerator actuation reaction force calculation section, the accelerator return operation sensing section, the driving force determination section, and the correction section.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including" "having" and their derivatives. Also, the terms "part," "section," "portion," "member" or "element" when used in the singular can have the dual meaning of a single part or a plurality of parts. Also as used herein to describe the above embodiments), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A headway maintenance assist system comprising:
    a preceding vehicle detection section configured to detect a headway distance between a host vehicle and a preceding vehicle;
    an accelerator actuation amount detection section configured to detect an accelerator actuation amount of an accelerator of the host vehicle;
    a reaction force computing section configured to calculate a reaction force to be generated in the accelerator based on the headway distance detected by the preceding vehicle detection section;
    a reaction force generating section configured to generate the reaction force calculated by the reaction force computing section in the accelerator;
    a running condition detection section configured to detect a running condition of the host vehicle;
    a driving force determination section configured to determine a target driving force of the host vehicle in accordance with the accelerator actuation amount detected by the accelerator actuation amount detection section;
    a drive source control section configured to control an output of a drive source towards the target driving force determined by the driving force determination section;
    an accelerator return detection section configured to detect a return operation of the accelerator of the host vehicle to decrease acceleration; and
    a correction section configured to change from using a first drive force/accelerator actuation relationship between the target drive force and the accelerator actuation amount to a second drive force/accelerator actuation relationship based on the running condition detected by the running condition detection section,
    the correction section being further configured to restore the first drive force/accelerator actuation relationship when the accelerator return detection section detects the return operation of the accelerator during travel,
    the target drive force in the first and second drive force/accelerator actuation relationships being set to monotonically increase with respect to the accelerator actuation amount, and
    the correction section being further configured to gradually correct the first drive force/accelerator actuation relationship to the second drive force/accelerator actuation relationship when the accelerator is subsequently operated to increase acceleration after the return operation of the accelerator.

2. The headway maintenance assist system according to claim 1, wherein
    the accelerator return detection section is further configured to determine the return operation of the accelerator, upon determining at least one of a decrease in the accelerator actuation amount is at a prescribed value or higher, an accelerator position is at a prescribed value or lower, and an accelerator release rate is at a prescribed value or higher.

3. The headway maintenance assist system according to claim 1, wherein
    the correction section is configured to change the first drive force/accelerator actuation relationship so that the target drive force is reduced with respect to the accelerator actuation amount in the second drive force/accelerator actuation relationship.

4. The headway maintenance assist system according to claim 1, wherein the correction section is further configured to set an offset amount of the accelerator actuation amount detected by the accelerator actuation amount detection section for changing the first drive force/accelerator actuation relationship to the second drive force/accelerator actuation relationship.

5. The headway maintenance assist system according to claim 1, further comprising a measuring unit configured to measure an elapsed time from a start of an increase acceleration operation of the accelerator, and the correction section being further configured to correct the first drive force/accelerator actuation relationship to the second drive force/accelerator actuation relationship, based on the elapsed time.

6. A drive force control apparatus comprising:

an accelerator actuation amount detection section configured to detect an accelerator actuation amount of an accelerator of a host vehicle;

a driving force determination section configured to determine a target driving force of the host vehicle in accordance with the accelerator actuation amount detected by the accelerator actuation amount detection section;

a drive source control section configured to control an output of a drive source towards the target driving force determined by the driving force determination section; and a correction section configured to perform acceleration based on a first drive force/accelerator actuation relationship and to subsequently correct the target driving force to a second drive force/accelerator actuation relationship in which the target driving force is made to be less than that of the first drive force/accelerator actuation relationships the target drive force in the first and second drive force/accelerator actuation relationships being set to monotonically increase with respect to the accelerator actuation amount; and the correction section being further configured to gradually correct the first drive force/accelerator actuation relationship to the second drive force/accelerator actuation relationship when the accelerator is subsequently operated to increase acceleration after a return operation of the accelerator.

7. The drive force control apparatus according to claim 6, further comprising an accelerator return detection section configured to detect the return operation of the accelerator of the host vehicle to decrease acceleration, and the correction section being further configured to restore the first drive force/accelerator actuation relationship when the return operation of the accelerator is detected, and to perform acceleration based on the first drive force/accelerator actuation relationship when the accelerator is subsequently operated to increase acceleration after the return operation of the accelerator.

8. The drive force control apparatus according to claim 6, further comprising a measuring unit configured to measure an elapsed time from a start of an increase operation of the accelerator, and the correction section being further configured to correct the first drive force/accelerator actuation relationship to the second drive force/accelerator actuation relationship, based on the elapsed time.

9. A headway maintenance assist system comprising:

means for detecting a headway distance between a host vehicle and a preceding vehicle;

means for detecting an accelerator actuation amount of an accelerator of the host vehicle;

computing means for calculating a reaction force to be generated in the accelerator based on the headway distance that was detected;

means for causing the accelerator to generate the reaction force that was calculated;

means for detecting a running condition of the host vehicle;

means for determining a target driving force of the host vehicle in accordance with the accelerator actuation amount that was detected;

means for controlling an output of a drive source towards the target driving force that was determined;

means for detecting a return operation of the accelerator of the host vehicle to decrease acceleration; and means for changing from using a first drive force/accelerator actuation relationship to a second drive force/accelerator actuation relationship based on the running condition detected by the running condition detection means, and for restoring the first drive force/accelerator actuation relationship when the accelerator return detection means detects the return operation of the accelerator during travel;

the target drive force in the first and second drive force/accelerator actuation relationships being set to monotonically increase with respect to the accelerator actuation amount; and the changing means being further configured for gradually correcting the first drive force/accelerator actuation relationship to the second drive force/accelerator actuation relationship when the accelerator is subsequently operated to increase acceleration after a return operation of the accelerator.

10. A drive force control apparatus comprising:

means for detecting an accelerator actuation amount of an accelerator of a host vehicle;

means for determining a target driving force of the host vehicle in accordance with the accelerator actuation amount that was detected;

means for controlling an output of a drive source towards the target driving force that was determined; and means for starting acceleration based on a first drive force/accelerator actuation relationship and for subsequently correcting the target driving force to a second drive force/accelerator actuation relationship in which the target driving force is made to be less than that of the first drive force/accelerator actuation relationship;

the target drive force in the first and second drive force/accelerator actuation relationships being set to monotonically increase with respect to the accelerator actuation amount; and the starting means being further configured for gradually correcting the first drive force/accelerator actuation relationship to the second drive force/accelerator actuation relationship when the accelerator is subsequently operated to increase acceleration after a return operation of the accelerator.

11. A headway maintenance assist method comprising:

causing an accelerator to generate a reaction force based on a headway distance between a preceding vehicle and a host vehicle;

sensing the running condition of the host vehicle;

correcting the target driving force of the host vehicle that corresponds to an operated value of an accelerator from a first drive force/accelerator actuation relationship to a second drive force/accelerator actuation relationship;

detecting a return operation of the accelerator of the host vehicle to decrease acceleration;

restoring the first drive force/accelerator actuation relationship when the return operation of the accelerator is detected during travel;

determining a target driving force of the host vehicle in accordance with the accelerator actuation amount that was detected;

controlling an output of a drive source towards the target driving force that was determined;

setting the target drive force in the first and second drive force/accelerator actuation relationships to monotonicall increase with resect to the accelerator actuation amount and gradually correcting the first drive force/accelerator actuation relationship to the second drive force/accelerator actuation relationship when the accelerator is subsequently operated to increase acceleration after a return operation of the accelerator.

12. A drive force control method comprising:

controlling an output of a drive source towards a target driving force corresponding to an accelerator actuation amount of the an accelerator;

performing acceleration based on a first drive force/accelerator actuation relationship when the accelerator is operated to increase acceleration;

subsequently correcting the target driving force of the host vehicle that corresponds to the accelerator actuation amount to a second drive force/accelerator actuation relationship in which the target driving force is made to be less than that of the first drive force/accelerator actuation relationship;

setting the target drive force in the first and second drive force/accelerator actuation relationships to monotonically increase with respect to the accelerator actuation amount; and gradually correcting the first drive force/accelerator actuation relationship to the second drive force/accelerator actuation relationship when the accelerator is subsequently operated to increase acceleration after a return operation of the accelerator.

* * * * *